US008558952B2

(12) United States Patent
Ishikawa

(10) Patent No.: US 8,558,952 B2
(45) Date of Patent: Oct. 15, 2013

(54) IMAGE-SOUND SEGMENT CORRESPONDING APPARATUS, METHOD AND PROGRAM

(75) Inventor: Masumi Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 478 days.

(21) Appl. No.: 12/601,566

(22) PCT Filed: May 15, 2008

(86) PCT No.: PCT/JP2008/058969
§ 371 (c)(1),
(2), (4) Date: Nov. 24, 2009

(87) PCT Pub. No.: WO2008/146616
PCT Pub. Date: Dec. 4, 2008

(65) Prior Publication Data
US 2010/0172591 A1    Jul. 8, 2010

(30) Foreign Application Priority Data
May 25, 2007  (JP) .................................. 2007-139333

(51) Int. Cl.
*H04N 9/475*  (2006.01)
*H04N 9/80*   (2006.01)
*G06K 9/62*   (2006.01)
*G06K 9/66*   (2006.01)
*G06K 9/46*   (2006.01)
*G06K 9/00*   (2006.01)

(52) U.S. Cl.
USPC ........... 348/515; 348/512; 382/224; 382/190; 382/103; 386/241

(58) Field of Classification Search
None
See application file for complete search history.

(56) References Cited

U.S. PATENT DOCUMENTS

| 6,928,233 | B1* | 8/2005 | Walker et al. ................. 386/241 |
| 2002/0031262 | A1* | 3/2002 | Imagawa et al. .............. 382/190 |
| 2005/0129278 | A1* | 6/2005 | Rui et al. ...................... 382/103 |
| 2006/0120609 | A1* | 6/2006 | Ivanov et al. ................. 382/224 |

FOREIGN PATENT DOCUMENTS

| JP | 10-191468 A | 7/1998 |
| JP | 20002365494 A | 8/2000 |
| JP | 2003132085 A | 5/2003 |
| JP | 2004056286 A | 2/2004 |
| JP | 2005322401 A | 11/2005 |
| WO | 2006062863 A | 6/2006 |

OTHER PUBLICATIONS

Y. Yaginuma et al., "A Proposal of a Synchronization Method between Drama Image, Sound and Scenario Document Using DP Matching", IEICE (Institute of Electronics. Information and Communication Engineers) Transactions, D-II, vol. J.79-D-II, No. 5, May 1996, pp. 747-755.

(Continued)

*Primary Examiner* — Jeffeery Harold
*Assistant Examiner* — Sean Haiem

(57) ABSTRACT

An apparatus includes an image segment classification means that analyzes an input video to generate image segment groups each segment including image segments which include an identical object; a sound segment classification means that analyzes the input video to generate sound segment groups each segment including sound segments which include an identical object; an inter-segment group score calculation means that calculates a similarity score between each image segment group and each sound segment group; and a segment group correspondence decision means that decides, using the scores, whether or not an object in the image segment groups and an object in the sound segment groups are the same.

26 Claims, 9 Drawing Sheets

(56) References Cited

OTHER PUBLICATIONS

Y. Iwai et al., "A Survey on Face Detection and Face Recognition", IPSJ SIG Technical Report, Information Processing Society of Japan, 20 5-CVIM-149, May 13, 2005, pp. 343-388.

S. Akamatsu, "Computer Recognition of Human Face—A Survey—", IEICE (Institute of Electronics, Information and Communication Engineers) Transactions. vol. J80-A, No. 8, pp. 1215-1230, Aug. 1997.

International Search Report for PCT Application No. PCT/JP2008/058969 mailed Aug. 19, 2008.

* cited by examiner

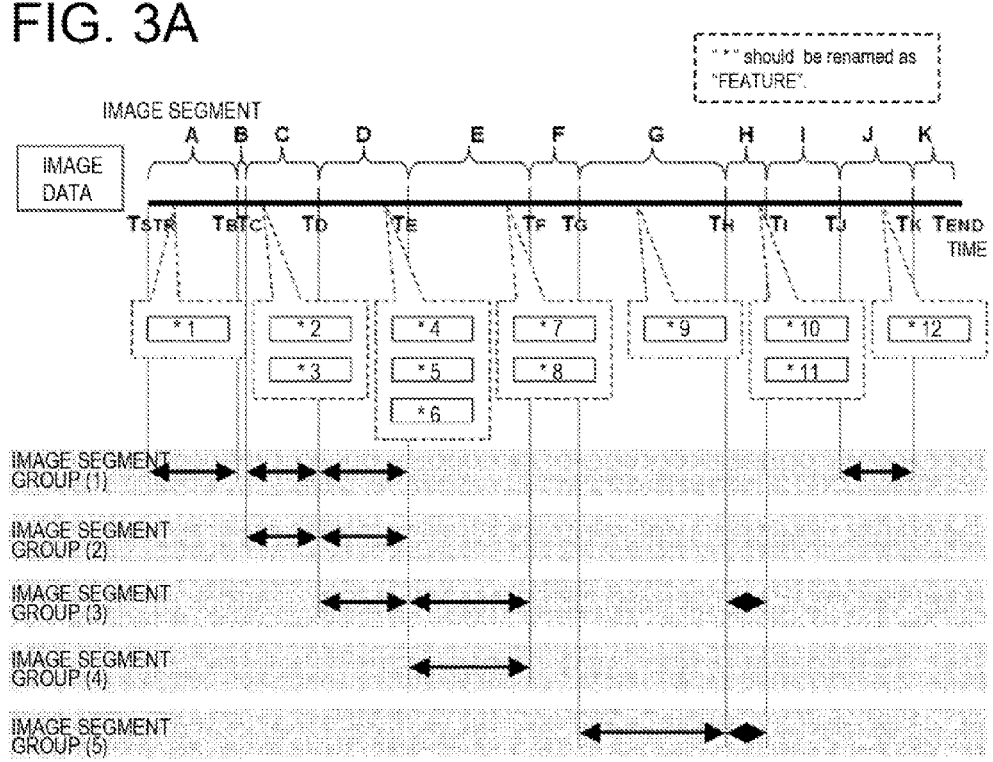
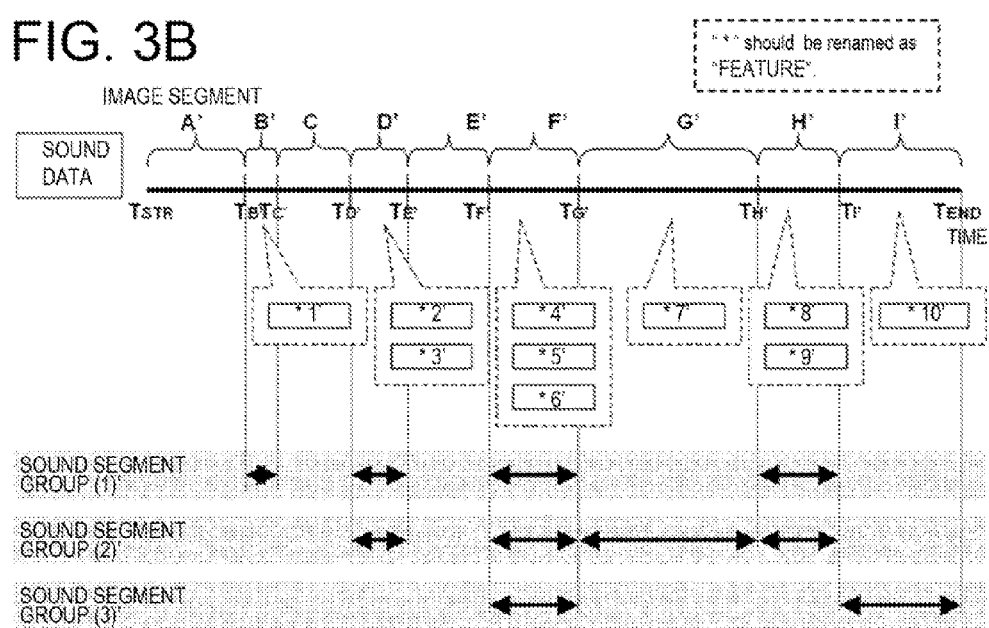

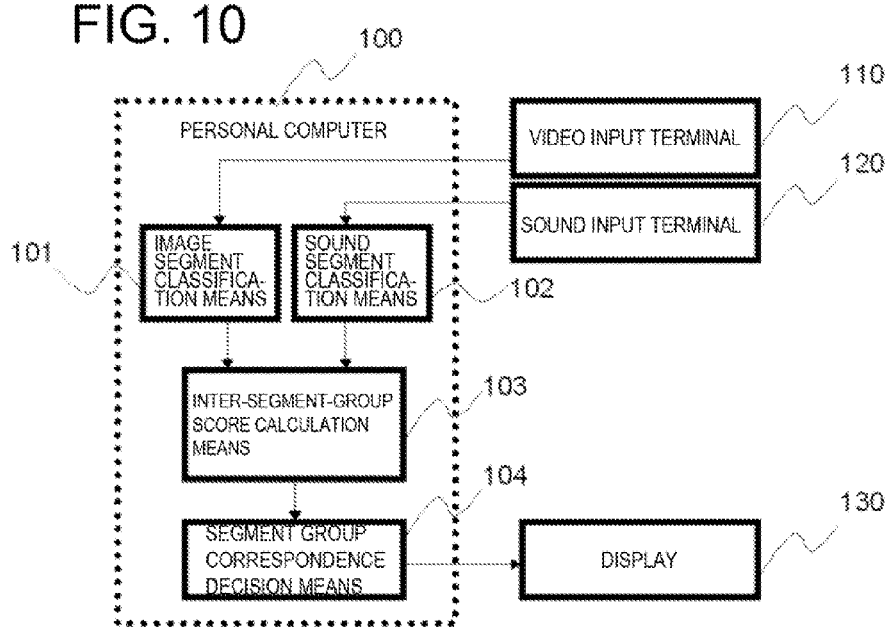
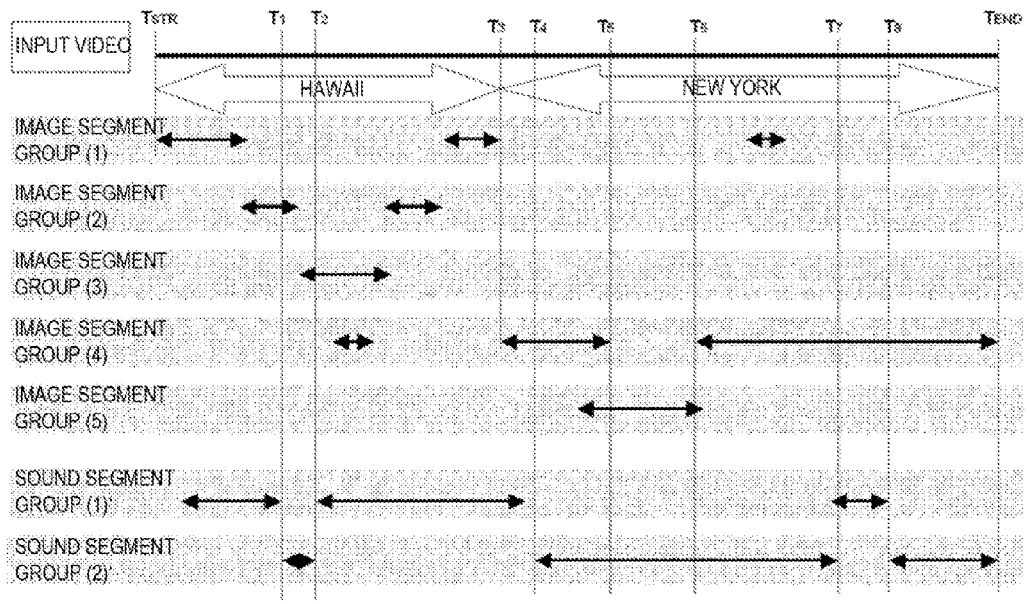

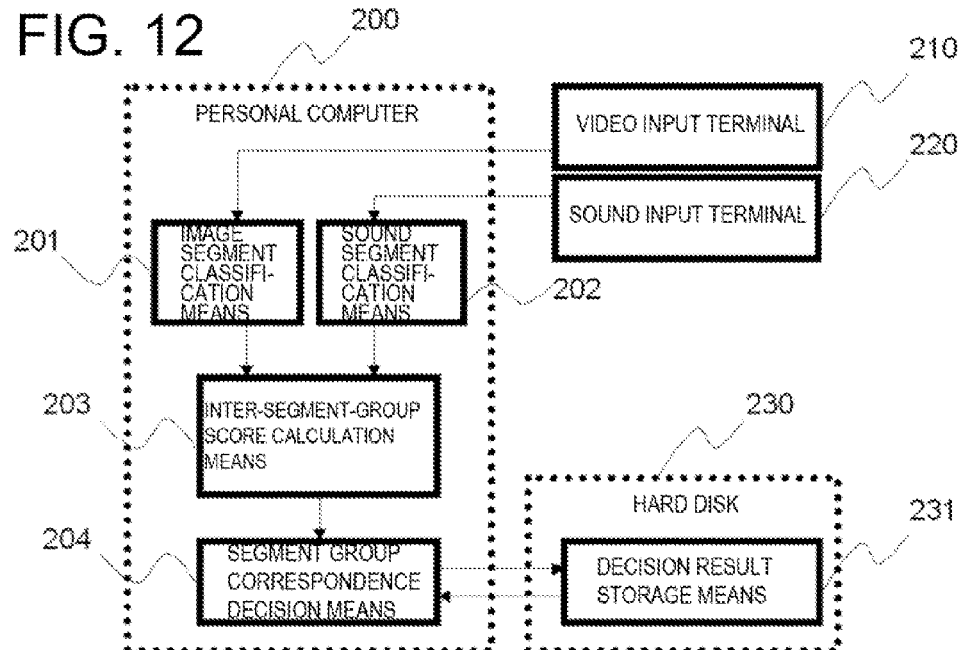

FIG. 14

| SOUND SEGMENT GROUP / IMAGE SEGMENT GROUP | (1)' | (2)' | (3)' |
|---|---|---|---|
| (1) | $(T_C-T_{C'}) + (T_E-T_{D'})$ | $T_E-T_{D'}$ | $T_K-T_J$ |
| (2) | $(T_C-T_{C'}) + (T_E-T_{D'})$ | $T_E-T_{D'}$ | 0 |
| (3) | $(T_E-T_{D'}) + (T_F-T_{F'}) + (T_I-T_H)$ | $(T_E-T_{D'}) + (T_F-T_{F'}) + (T_I-T_H)$ | $T_F-T_{F'}$ |
| (4) | $T_F-T_{F'}$ | $T_F-T_{F'}$ | $T_F-T_{F'}$ |
| (5) | $T_I-T_H$ | $T_I-T_G$ | 0 |

FIG. 15

| CORRESPONDENCE RELATION PATTERN / SEGMENT TYPE | IMAGE SEGMENT | SOUND SEGMENT |
|---|---|---|
| (i) | $T_{STR} \sim T_B$<br>$T_C \sim T_E$ | $T_F \sim T_{END}$ |
| (ii) | $T_D \sim T_F$ | $T_B \sim T_E$<br>$T_F \sim T_G$<br>$T_H \sim T_I$ |
| (iii) | $T_G \sim T_H$ | $T_D \sim T_E$<br>$T_F \sim T_I$ |

IMAGE-SOUND SEGMENT CORRESPONDING APPARATUS, METHOD AND PROGRAM

CROSS-REFERENCE TO RELATED APPLICATIONS

The present application is the National Phase of PCT/JP2008/058969, filed May 15, 2008, which is based upon and claims priority from Japanese Patent Application 2007-139333 (filed on May 25, 2007) the content of which is hereby incorporated in its entirety by reference into this specification.

TECHNICAL FIELD

The present invention relates to an image-sound segment corresponding apparatus, an image-sound segment corresponding method, and an image-sound segment corresponding program, and more particularly to an image-sound segment corresponding apparatus, an image-sound segment corresponding method, and an image-sound segment corresponding program that find correspondence between a plurality of image segments, obtained from image data constituting an input video, and a plurality of sound segments obtained from voice data.

BACKGROUND ART

As an example of the technology related to the method for finding correspondence between image segment and sound segment, Patent Document 1 (Japanese Patent Publication. Kokai JP-A No. 2004-56286) discloses an image display method that in order to improve accuracy in finding correspondence between a person in image and speech and to display text data converted from voice in accurate correspondence with the speaker. This method extracts a person area from image data, calculates image feature, estimates a person based on the image feature and calculates voice feature from voice data, estimates a person from the voice feature, collects statistics on the situation in which a person estimated from the image data and a person estimated from the voice data appear in the same scene at the same time and, based on the statistical result, identifies a person who has generated the voice data, and displays the text data converted from voice near the identified person on the display screen.

The method disclosed in Patent Document 1 finds correspondence person segments, generated by classifying image segments in an input video according to persons that appear, and the voice segment groups, generated by classifying the sound segments according to the persons that appear, based on the statistics on the situation in which person segments and voice segments appear at the same time in the same scene.

For example, between the person segments of N persons and the voice segments of M persons estimated from the sound data, the number of times person segments and voice segments appear in the same scene at the same time is collected and, based on the collected result, correspondence between person segments and sound segments, which have a high appearance correlation, is made. As shown in FIG. 17, the configuration to establish correspondence in this way comprises a person extraction means 600 that detects a person from the image data of an input video and extracts the image feature, a voice extraction means 601 that detects human voices from the sound data and extracts the voice feature, a person segment classification means 602 that classifies the segments, in which persons are detected, based on the image feature, a voice segment classification means 603 that classifies the segments, in which human voices are detected, based on the sound feature, a simultaneous occurrence statistic means 604 that collects statistics on the situation in which person segments and voice segments occur simultaneously, and a person identification means 605 that find correspondence between person segments and sound segments based on the statistical quantity.

An example of the related technology of a system for individually making correspondence between an image segment and a sound segment is disclosed in Non-Patent Document 1. Non-Patent Document 1 discloses a method for making correspondence between voices and videos via DP matching with the aim of synchronizing multimedia data (text, video, and voice in the scenario document) that is not temporally synchronized in advance. The method disclosed in Non-Patent Document 1 makes correspondence between image segments and sound segments by non-linearly expanding and compressing the appearance patterns of the segments for the image segments and sound segments, extracted in advance as an observation result of the same object in the input video, to find an optimal match. For example, based on the image feature and the sound feature of a particular person acquired in advance, the disclosed method makes correspondence between image segments and sound segments by non-linearly expanding and compressing the patterns to find the optimal match using "patterns regarding presence/absence of a particular-person" obtained from the image data of the input video and "patterns regarding presence/absence of a particular-person" obtained from the voice data. As shown in FIG. 16, the configuration comprises an image segment extraction means 500 that extracts the image segments, in which a particular person appears, from the image data in the input video, a voice segment extraction means 501 that extracts the voice segments of a particular person from the voice data, and a DP matching means 502 that makes correspondence between image segments and sound segments by non-linearly expanding and compressing the appearance patterns of the image segments and the appearance patterns of the sound segments to find an optimal match.

Patent Document 1:
    Japanese Patent Kokai Publication No. JP2004-56286A

Non-Patent Document 1:
    Yoshitomo Yaginuma and Masao Sakauchi, "A Proposal of an approach for making correspondence for Drama Video, Sound and Scenario Document Using DMatching", IEICE (Institute of Electronics, Information and Communication Engineers) Transactions D-II Vol. J. 79-D-II No. 5, May 1996, pp. 747-755

Non-Patent Document 2:
    Iwai, Lao, Yamaguchi, and Hirayama, "A Survey on Face Detection and Face Recognition", Study Report from Information Processing Society of Japan (CVIM-149), 2005 pp. 343-368

Non-Patent Document 3:
    Shigeru Akamatsu, "Computer Recognition of Human Face—A Survey—" IEICE Transactions Vol. J80-A No. 8 pp. 1215-1230, August 1997

SUMMARY

The disclosed contents of Patent Document 1 and Non-Patent Documents 1 to 3 given above are hereby incorporated by reference into this specification. The following gives an analysis of the technology related to the present invention.

The problem with the related technology described above is that, when there are a plurality of image segments of an occurrence pattern similar to the occurrence pattern of sound segments, a plurality of image segments are sometimes made to correspond erroneously to the same sound segment even if the objects of those a plurality of image segments are different.

The reason is that, when making correspondence between sound segments and image segments is decided in the related technology described above, the decision is made only on the occurrence patterns of the sound segments and the image segments with no consideration for correlation of the occurrence patterns between the sound segments and other image segments.

The related technology described above tends to erroneously make correspondence between image segments and sound segments that appear close in time but include different objects.

The reason is that, when deciding correspondence between sound segments and image segments, the related technology described above decides the correspondence based only on the general similarity in the appearance patterns generated by non-linearly expanding or compressing the segment groups with no consideration for the time during which the image segments and the sound segments are present at the same time in the video.

It is an object of the present invention to provide an apparatus, a method, and a program that makes it possible to make correspondence between image segments and sound segments when the image segments and sound segments include an identical object.

A method (apparatus, program) in one aspect of the present invention comprises (a) an image segment classification step (unit, processing) that analyzes an input video to generate a plurality of image segment groups each including a plurality of image segments which include an identical object;

(b) a sound segment classification step (unit, processing) that analyzes the input video to generate a plurality of sound segment groups each including a plurality of sound segments which include an identical object;

(c) an inter-segment group score calculation step (unit, processing) that calculates a similarity score between each image segment group and each sound segment group based on a time duration on which the image segment group and the sound segment group are present at the same time; and (d) a segment group correspondence decision step (unit, processing) that decides, using the scores, whether or not an object in the image segment groups and an object in the sound segment groups are the same to make correspondence between the image segment groups and the sound segment groups included in the input video.

In the image segment classification step (unit, processing), an image feature of an object may be extracted from each image segment in the input video so that a plurality of image segments having a similar image feature of an object are classified into the same image segment group.

In the sound segment classification step (unit, processing), a sound feature of an object may be extracted from each sound segment in the input video so that a plurality of sound segments having a similar sound feature of an object are classified into the same sound segment group.

In the image segment classification step (unit, processing), the image segments may be classified so that each image segment in the input video belongs to one image segment group but does not belong multiply to a plurality of image segment groups.

In the sound segment classification step (unit, processing), the sound segments may be classified so that each sound segment in the input video belongs to one sound segment group but does not belong multiply to a plurality of sound segment groups.

In the image segment classification step (unit, processing), the image segments in the input video may be classified into the same number of image segment groups as that of the sound segment groups generated in the sound segment classification step (unit, processing).

In the sound segment classification step (unit, processing), the sound segments in the input video may be classified into the same number of sound segment groups as that of the image segment groups generated in the image segment classification step (unit, processing).

In the inter-segment group score calculation step (unit, processing), the similarity score between each image segment group and each sound segment group may be calculated based on a time duration on which only one of the image segment group and the sound segment group is present.

In the inter-segment group score calculation step (unit, processing), the similarity score between each image segment group and each sound segment group may be calculated using the similarity score between each image segment group and each sound segment group and a weight calculated based on one of the image feature and the sound feature extracted from the segments or a combination thereof.

In the segment group correspondence decision step (unit, processing), the decision may be made whether or not an object included in the image segment groups and an object included in the sound segment groups are the same, based on the scores to make one-to-one correspondence between the image segment groups and the sound segment groups.

In the segment group correspondence decision step (unit, processing), the decision may be made whether or not an object included in the image segment groups and an object included in the sound segment groups are the same based on the scores to make one-to-many correspondence between the image segment groups and the sound segment groups.

In the segment group correspondence decision step (unit, processing), the decision may be made whether or not an object included in the image segment groups and an object included in the sound segment groups are the same based on the scores to make many-to-many correspondence between the image segment groups and the sound segment groups.

In the segment group correspondence decision step (unit, processing), for combination of image segment groups and sound segment groups, beginning with a set of an image segment group and a sound segment group for which the highest of the scores is calculated, the decision may be made sequentially whether or not an object included in the image segment groups and an object included in the sound segment groups are the same to make one-to-one correspondence between the image segment groups and the sound segment groups.

In the segment group correspondence decision step (unit, processing), for combination of image segment groups and sound segment groups each having a score greater than or equal to a predetermined threshold and beginning with a set of an image segment group and a sound segment group for which the highest of the scores is calculated, the decision may be made sequentially whether or not an object included in the image segment groups and an object included in the sound segment groups are the same to make one-to-one correspondence between the image segment groups and the sound segment groups.

In the segment group correspondence decision step (unit, processing), in descending order of time length, or numbers of segments, of the image segments belonging to the image segment groups, each image segment group may be made to correspond to a sound segment group which has the highest score with the image segment group and which is not made to correspond to other image segment groups.

In the segment group correspondence decision step (unit, processing), in descending order of time length, or numbers of segments, of the sound segments belonging to the sound segment groups, each sound segment group may be made to correspond to an image segment group which has the highest score with the sound segment group and which is not made to correspond to other sound segment groups.

In the segment group correspondence decision step (unit, processing), in descending order of time length, or numbers of segments, of the image segments belonging to the image segment groups, each image segment group may be made to correspond to a sound segment group which has the highest score with the image segment group and whose score with other image segment groups is less than or equal to a predetermined threshold.

In the segment group correspondence decision step (unit, processing), in descending order of time length, or numbers of segments, of the sound segments belonging to the sound segment groups, each sound segment group may be made to correspond to an image segment group which has the highest score with the sound segment group and whose score with other sound segment groups is less than or equal to a predetermined threshold.

In the segment group correspondence decision step (unit, processing), for the scores of the plurality of image segment groups and the scores of the plurality of sound segment groups, correspondence between an image segment group and a sound segment group having the highest score calculated, may be made.

In the segment group correspondence decision step (unit, processing), when the image segment group or the sound segment group has a score, less than or equal to a predetermined threshold, with any sound segment group or image segment group, the image segment group or the sound segment group may not be made to correspond to any sound segment group or image segment group deciding that the image segment group or the sound segment group does not include an identical object as an object of any sound segment group or image segment group.

The image segment may be a vide segment generated by dividing a video based on a time position of an appearance or a disappearance of a human face.

The sound segment may be an audio segment generated by dividing a video based on a time position of an appearance or a disappearance of a human voice.

When plural faces appear in the same frame of a video, the image segment may be a video segment generated by dividing the video based on a time position of an appearance or a disappearance of each face.

When plural persons speak at the same time in a video, the sound segment may be an audio segment generated by dividing the video based on a time position of an occurrence or an extinction of each voice.

A method (apparatus, program) in another aspect of the present invention comprises (e) a facial segment classification step (unit, processing) that analyzes an input video to generate a plurality of facial segment groups, each including image segments including faces of the same person;

(f) a voice segment classification step (unit, processing) that analyzes the input video to generate voice segment groups each including sound segments including voices of the same person;

(g) an inter-segment group score calculation step (unit, processing) that calculates a similarity score between each facial segment group and each voice segment group based on a time duration on which the facial segment group and the voice segment group are present at the same time; and (h) a segment group correspondence decision step that makes a decision, using the scores, whether or not a person in the facial segment groups and a person in the voice segment groups are the same.

In the inter-segment group score calculation step (unit, processing), the similarity score between each facial segment group and each voice segment group may be calculated using a time, during which the facial segment group and the voice group are present at the same time, and one of, or a combination of, a face position, a face size, and a face direction extracted from each image segment and a voice volume and a voice clarity extracted from each sound segment.

A method (apparatus, program) in another aspect of the present invention comprises (i) a facial segment classification step (unit, processing) that classifies image segments, generated by dividing a video based on a time position of an appearance or a disappearance of a face, to generate facial segment groups each including a plurality of image segments which include a face of the same person;

(j) a voice segment classification step (unit, processing) that classifies sound segments, generated by dividing the video based on a time position of an occurrence or an extinction of a voice, to generate voice segment groups each including a plurality of sound segments which include a voice of the same person;

(k) an inter-segment group score calculation step (unit, processing) that calculates a similarity score between each facial segment group and each voice segment group based on a time duration on which the facial segment group and the voice segment group are present at the same time; and (l) a segment correspondence step (unit, processing) that makes a decision whether or not a person in the facial segment groups and a person in the voice segment groups are the same, beginning with a set of a facial segment group and a voice segment group for which the highest of the scores is calculated, to make one-to-one correspondence between the facial segment groups and the voice segment groups. According to the present invention, there is provided a computer-readable storage medium storing the above described program.

The present invention makes it possible to make correspondence between the sound segments and the image segments that have an identical object, when there are a plurality of image segments whose occurrence pattern is similar to the occurrence pattern of the sound segments.

The reason is that, when deciding correspondence between sound segments and image segments, the present invention considers scores, calculated between the image segments and other sound segments to make the correspondence between sound segments and image segments.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 3A and 3B are diagrams showing the operation of the image segment classification means and sound segment classification means in the first exemplary embodiment.

FIG. 10 is a block diagram showing the configuration of a first example.

FIG. 11 is a diagram showing an example of a classification result by the image segment classification means in the first example.

FIG. 12 is a block diagram showing the configuration of a second example.

FIGS. 13A and 13B are diagrams showing an example of time information on the image segments input by the image segment input means and an example of time information on the sound segments input by the sound segment input means in the first exemplary embodiment.

FIG. 14 is a diagram showing an example of scores calculated by the inter-segment group score calculation means in the first exemplary embodiment.

FIG. 15 is a diagram showing an example of a decision result output by the decision result output means in the first exemplary embodiment.

PREFERRED MODES

In the present invention, whether or not an object of an image segment group and an object of a sound segment group are identical is determined based on scores which are calculated based on time during which the image segment group and the sound segment group are present at the same time. This method ensures that in a case wherein there are a plurality of image segment groups, each having an occurrence pattern similar to an occurrence pattern of a sound segment group, correspondence between a sound segment group and an image segment group, which have an identical object, are made.

According to the present invention, correspondence between an image segment group and a sound segment group are made, using scores calculated based on time during which the image segment group and the sound segment group are present at the same time in a video. This method prevents erroneous correspondence between an image segment group and a sound segment group regarding different objects which appear close in time, from being made.

Exemplary embodiments of the present invention will be described in detail with reference to the drawings.

Figure 1:
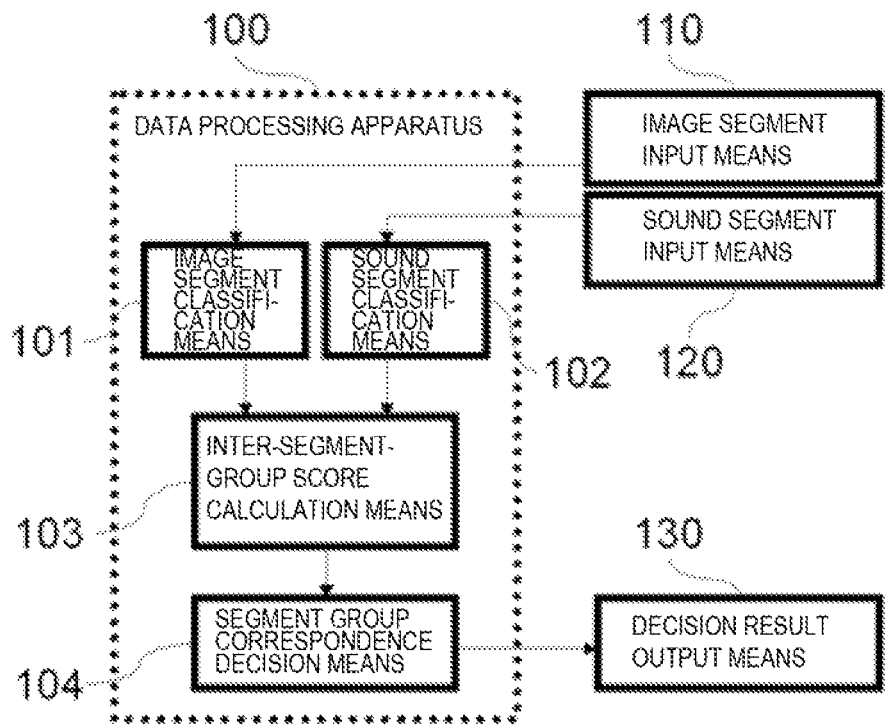
FIG. 1 is a block diagram showing the configuration of a first exemplary embodiment.

FIG. 1 is a diagram showing the configuration of a first exemplary embodiment of the present invention. Referring to FIG. 1, the first exemplary embodiment of the present invention comprises:

a data processing apparatus 100 that performs operation under program control, an image segment input means (unit) 110 that receives information on each image segment of an input video, a sound segment input means (unit) 120 that receives information on each sound segment of an input video, and a decision result output means (unit) 130 that outputs a decision result of correspondence between the image segment groups and the sound segment groups.

The data processing apparatus 100 includes:

an image segment classification means (unit) 101, a sound segment classification means (unit) 102, an inter-segment group score calculation means (unit) 103, and a segment group correspondence decision means (unit) 104.

The image segment input means 110 supplies the image data of each image segment in an input video, as well as time positions of the start point and the end point of each image segment in the input video, to the image segment classification means 101.

An image segment may be a shot which is divided by on and off of a camera. An image segment may also be a scene which is divided by a change in a shooting set. An image segment may also be a segment which is divided by whether or not the object is the same. An image segment may be a segment which is divided by the appearing point and the disappearing point of an object.

An object may be each frame that forms image data. An object may also be a moving area that has an identical moving component such as a car or a ball. An object may also be a static area having an identical color component such as a sky or a ground. An object may also be a part of a frame such as an image area having a certain pattern, such as a person or an animal.

The sound segment input means 120 supplies the sound data of each sound segment in an input video, as well as time positions of the start point and the end point of each sound segment in the input video, to the sound segment classification means 102.

A sound segment may be a segment which is divided, for example, by a sound volume.

A sound segment may also be a segment which is divided by a change point at which BGM changes. A sound segment may also be a segment which is divided by whether or not a sound is generated for an identical object. A sound segment may also be a segment which is divided by an appearing point and a disappearing point of the sound for an object.

The sound for an object may also be a sound effect related in advance to the object. The sound for an object may also be a sound generated by a moving area or a static area. The sound for an object may also be a sound of a person or an animal.

The image segment classification means 101 classifies image segments based on image data on a plurality of image segments received from the image segment input means 110 and generates a plurality of image segment groups each of which includes a plurality of image segments.

The image segment classification means 101 supplies time positions of start points and end points of the image segments, which are classified into respective image segment groups, and the image data of the image segments to the inter-segment group score calculation means 103.

One of the image segment classification methods used by the image segment classification means 101 is that frames, which are selected from the image segments, are compared and the image segments which have frames with a small inter-frame difference are classified into the same image segment group.

Another classification method is that image features of the objects included in the image segments are extracted and the image segments, which have image features of the objects similar to each other, are classified into the same image segment group.

Each of the image segments may be classified only into one image group or into a plurality of image segment groups. For example, for a video clip including a plurality of tourist spots, each of image segments is classified into only one image group, when one type of objects is included in each image segment, as in a case wherein the object is a frame, an image segment is in a unit of a shot, and video segments are classified according to tourist spots.

On the other hand, for a monitor video including a plurality of persons, each image segment is classified into a plurality of image segment groups when a plurality of types of objects may be included in each image segment, as in a case wherein the object is a person, the image segment unit is divided by the appearing point and the disappearing point of persons, and the image segments are classified according to persons.

The number of generated image segment groups may be a predetermined number.

The number of generated image segment groups may or may not be equal to the number of sound segment groups obtained as a result of the sound segment classification means 102.

The sound segment classification means 102 classifies sound segments based on sound data of a plurality of sound segments received from the sound segment input means 120 and generates a plurality of sound segment groups, each group including a plurality of sound segments.

The sound segment classification means 102 supplies the time positions of the start points and the end points of sound segments, classified into each sound segment group, and the sound data of the sound segments to the inter-segment group score calculation means 103.

One of the sound segment classification methods used by the sound segment classification means 102 is that sound segments whose sound volume is similar to each other are classified into the same sound segment group or segments in which the musical instruments or melodies are similar to each other are classified into the same group.

Another sound segment classification method is that the segments in which voiceprints or speech speeds are similar to each other are classified into the same sound group.

The sound segments may be classified only into one sound segment group.

The sound segments may be classified also into a plurality of sound segment groups. For example, for an introduction video of a plurality of tourist spots in which BGM related to each spot is used, the sound segments are classified into only one sound group, when one type of objects is included in each sound segment, as in a case wherein the object is a melody, the sound segment is a segment divided by the start point and the end point of BGM, and segments are classified according a similarity in the melody.

On the other hand, for a drama video in which a plurality of persons appear and speak, sound segments are classified into a plurality of sound segment groups when a plurality of types of objects may be included in sound segments, as in a case wherein the object is voices, the sound segment unit is a segment divided by the start point and the end point of voice production, and the sound segments are classified according to speakers.

The number of generated sound segment groups may be a predetermined number. Alternatively, the number of generated sound segment groups may or may not be equal to the number of image segment groups obtained as a result of the image segment classification means.

The inter-segment group score calculation means 103 calculates similarity scores of the combinations of the image segment groups and the sound segment groups, using the time positions of the start points and the end points of the image segments, which are received from the image segment classification means 101 and classified into image segment groups, and the time positions of the start points and the end points of the sound segments which are received from the sound segment classification means 102 and classified into sound segment groups.

The time positions and the image data of the image segments belonging to the image segment groups, the time positions and sound data of the sound segments belonging to the sound segment groups, and the scores calculated for the combination of the image segment groups and the sound segment groups are input to the segment group correspondence decision means 104.

The score calculated by the inter-segment group score calculation means 103 segment may be a length of time during which an image segment and a sound segment are present at the same time. The length of time is obtained from the start points and the end points of the image segments belonging to each image segment group and the start points and the end points of the sound segments belonging to each sound segment group.

The score may also be a ratio of the length of time described above to the length of time of each image segment group.

The score may also be calculated based on the length of time during which only one of the image segments belonging to an image segment group and the sound segments belonging to a sound segment group appears.

Alternatively, the segment group correspondence decision means 103 segment may calculate the score by adding a weight based on the image data of each image segment group or the sound data of each sound group received from the image segment classification means 101 or sound segment classification means 102. The weight may be calculated based on the image position, size, and direction of the object obtained from the image data or based on the clarity and volume of the object obtained from the sound data.

The segment group correspondence decision means 104 decides whether or not the object in an image segment group and the object in a sound segment group are identical, based on the scores calculated between a plurality of image segment groups and a plurality of sound segment groups obtained from the inter-segment group score calculation means 103.

The time positions and the image data of the image segments belonging to the image segment groups, the time positions and the sound data of the sound segments belonging to the sound segment groups, and the decision result between the image segment groups and the sound segment groups are input to the decision result output means 130.

An example of the correspondence relation decision method is that in descending order of a sum of the time lengths, or the number of segments, of the image segments belonging to an image segment group, each image segment group and a sound segment group whose score with the image segment group is highest and whose score with other image segment groups is less than or equal to the predetermined threshold may be treated to have a correspondence as segment groups including an identical object.

Another decision method is that in descending order of the sum of the time lengths, or the number of segments, of the sound segments belonging to a sound segment group, each sound segment group and an image segment group whose score with the sound segment group is highest and whose score with other sound segment groups is less than or equal to the predetermined threshold may be treated to have a correspondence as the segment groups including an identical object.

If the calculated score of an image segment group or a sound segment group is equal to or less than the predetermined threshold, the segment group need not to make a correspondence, assuming that the segment group does not include an identical object as that in any sound segment group or image segment group.

The decision result output means 130 outputs the decision result received from the segment group correspondence decision means 104.

As the format of the output, a table may be provided in which the time information on start points and the end points of the image segments and the sound segments are collected and the correspondence thereof is made. Alternatively, based on the image data of the image segments belonging to each image segment group and the sound data of the sound segments belonging to each sound segment group received from the segment group correspondence decision means 104, the image data and the sound data out of the image segment groups and the sound segment groups, the correspondence thereof being made, are combined to generate a new video and the generated video is accumulated on a hard disk or output on the display.

Figure 2:
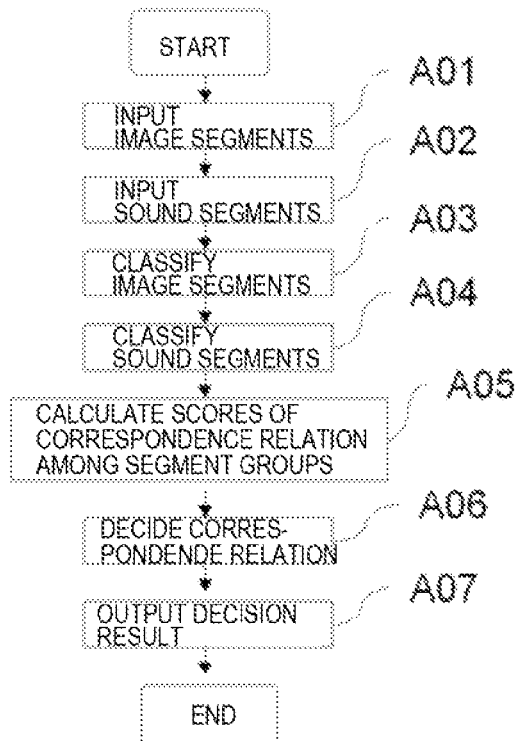
FIG. 2 is a flowchart showing the operation of the first exemplary embodiment.

Next, the following describes the general operation of this exemplary embodiment in detail with reference to FIG. 1 and the flowchart in FIG. 2.

First, the image segment input means 110 inputs into the image segment classification means 101 the image data and the time positions of the start points and the end points in an input video as the information on the image segments which form the input video (step A01 in FIG. 2).

FIG. 13A shows a table indicating the information on image segments of image segments A to K as an example of the information on the image segments input by the image segment input means 110. The information on the image segments may be of the format shown in FIG. 13A, or may be of another format.

The sound segment input means 120 supplies to the sound segment classification means 102 the sound data on the sound segments, which constitutes an input video, and the time positions of start points and end points in the input video (step A02 in FIG. 2).

FIG. 13B shows a table indicating the information on sound segments of sound segments A' to I' as an example of the information on the sound segments input by the sound segment input means 120. The information on the image segments may or may not be the format shown in FIG. 13B.

The image segment classification means 101 classifies the image segments based on the image data on a plurality of image segments received from the image segment input means 110 and generates a plurality of image segment groups each including a plurality of image segments (step A03).

The following describes the operation of the image segment classification means 101 with reference to FIG. 3A.

Assume that the information on the image segments received from the image segment input means 110 and shown in FIG. 13A is received. Assume that the image segments are segments each divided by the appearing point and the disappearing point of an object.

Also assume that image feature 1 to image feature 12 are extracted as a result of the extraction of the image feature from the object included in each image segment.

The image feature may be a feature vector generated based on one or a combination of the color, shape, texture, and size that are extracted from each image area of an object detected from the representative frame of the image segment based on the templates held in advance by the image segment classification means 101.

Another feature vector may also be used that is generated by detecting the image areas of an object from each frame of an image segment based on the templates, extracting the feature vector from each image area, classifying the feature vectors, extracted from all frames in the image segment, based on the similarity, and calculating the average of the feature vectors for each classification.

The image feature is extracted for each of one or more objects detected from the image segment.

The image segment classification means 101 classifies image segments A to K based on the similarity in image feature 1 to 12 and generates image segment groups.

For example, if the image feature are classified into five, (1,2,4,12), (3,5), (6,7,11), (8), and (9,10), as a result of the decision of the similarity in the image feature, the image segment classification means 101 generates:

image segment group (1) from the image segments A, C, D, and J, image segment group (2) from the image segments C and D, image segment group (3) from the image segments D, E, and H, image segment group (4) from the image segment E, and image segment group (5) from the image segments G and H.

The sound segment classification means 102 classifies the sound segments based on the sound data of a plurality of sound segments received from the sound segment input means 120 and generates a plurality of sound segment groups each of which includes a plurality of sound segments (step A04).

The operation of the sound segment classification means 102 will be described with reference to FIG. 3B.

Assume that information on the sound segments received from the sound segment input means 120 and shown in FIG. 13B is received.

Assume that the sound segments are segments each divided by the appearing point and the disappearing point of the sound of an object. Also assume that sound feature 1' to sound feature 10' are extracted as a result of the extraction of the sound feature from the object included in each sound segment.

The sound feature may be used as a feature vector that has frequency component of the sound of an object which has been extracted based on a template waveform held in advance by the sound segment classification means 102.

The sound feature is extracted for sounds regarding one or more objects detected from the sound segment.

The sound segment classification means 102 classifies sound segments A' to I' based on the similarity in sound feature 1' to 10' and generates sound segment groups. For example, if the sound features are classified into three, (1',2', 4',9'), (3',5',7',8'), and (6',10'), as a result of the decision of the similarity in the sound feature, the sound segment classification means 102 generates:

sound segment group (1)' from the sound segments B', D', F', and H', sound segment group (2)' from the sound segments D', F', G', and H', and sound segment group (3)' from the sound segments F' and I'.

The inter-segment group score calculation means 103 calculates a similarity score between each image segment group and each sound segment group, based on a time duration on which the image segment group and the sound segment group are present at the same time, that is obtained from time positions of the start points and the end points of the image segments belonging to the image segment group and the time positions of the start points and the end points of the sound segments belonging to the sound segment group (step A05).

The operation of the inter-segment group score calculation means 103 will now be described with reference to FIG. 4.

The score between image segment group (1) and sound segment group (1)' is calculated as (TC'−TC)+(TE−TD').

The score between image segment group (1) and sound segment group (3)' is calculated as (TK−TJ).

FIG. 14 shows the scores calculated between the other image segment groups and the other sound segment groups in the same way.

In FIG. 14, scores of the same-order are enclosed by broken lines and the order of the scores is shown.

Based on the scores received from the inter-segment group score calculation means 103, the segment group correspondence decision means 104 determines whether or not an object included in an image segment group and an object included in a sound segment group are the same and makes correspondence between the image segment group and the sound segment group that are decided that an identical object is included (step A06).

Figure 4:
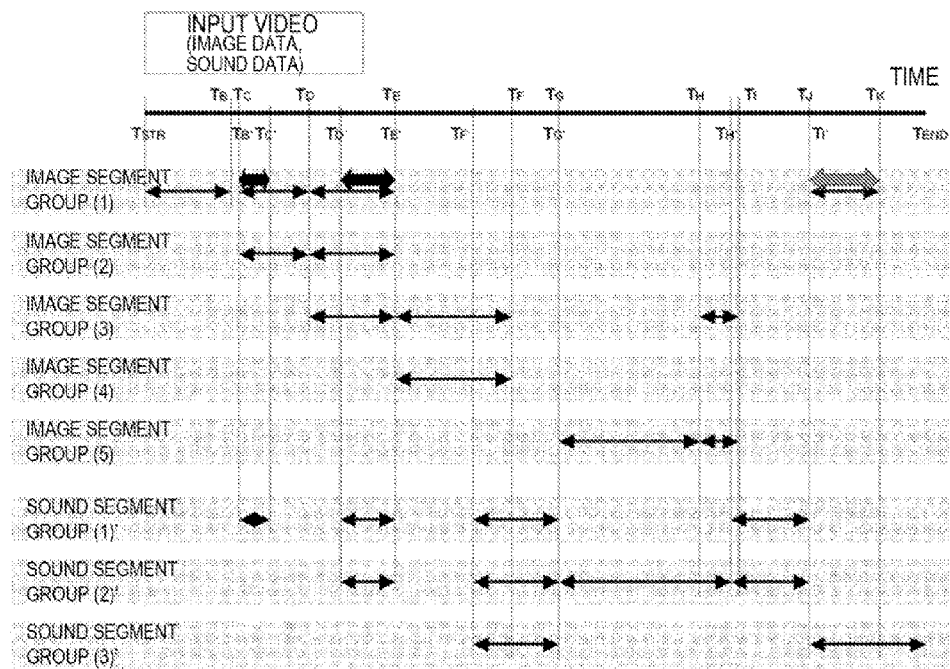
FIG. 4 is a diagram showing the operation of the inter-segment group score calculation means in the first exemplary embodiment.

The operation performed when the image segment groups and the sound segment groups shown in FIG. 4 and the scores shown in FIG. 14 are input to the segment group correspondence decision means 104.

The image segment groups, which are arranged in the descending order of the sum of the image segments, (1)->(3)->(5)->(2)->(4), and the same-order are made to correspond to the sound segment groups in this order.

First, image segment group (1) has the highest score with sound segment group (1)'.

However, because the sound segment group (1)' has a higher score with image segment group (3), sound segment group (1)' is not made to correspond to image segment in group (1).

Therefore, image segment group (1) is made to correspond to sound segment group (3)' that has the next highest score and has a score lower than that with other image segment groups.

Image segment group (3) has the highest score with sound segment group (2)' but, because sound segment group (2)' has a higher score with image segment group (5), correspondence between image segment group (3) and sound segment group (2)' are not made.

Therefore, image segment group (3) is made to correspond to sound segment group (1)' that has the next highest score.

Image segment group (5) is made to correspond to sound segment group (2)' with which the highest score is calculated.

Image segment group (2) has the highest score with sound segment group (1)' but, because the sound segment group (1)' has a higher score with image segment group (3), correspondence between image segment group (2) and sound segment group (1)' are not made. Image segment group (2), which has a lower score with any other sound segment groups, is not made to correspond to any of sound segment groups.

Image segment group (4), which has a lower score with any sound segment group, is not made to correspond to any sound segment group.

The decision result output means 130 outputs the decision result of making correspondence between the image segment groups and the sound segment groups received from the segment group correspondence decision means 104 (step A07).

The output format may be a table, such as the one shown in FIG. 15, that represents correspondence between the image segments and the sound segments. A new video generated by combining the image segments and sound segments, correspondence therebetween being made, may also be presented or accumulated, or any other format may also be used.

Next, the effect of this exemplary embodiment will be described in the below.

When making correspondence between sound segments and image segments is decided according to the related technology described above, the decision is made based only on the occurrence patterns of the sound segments and the image segments with no consideration for the occurrence pattern correlation between the sound segments and other image segments. Therefore, when there are a plurality of image segments of an occurrence pattern similar to the occurrence pattern of sound segments, a plurality of image segments are sometimes made to correspond erroneously to the same sound segment even if the objects of those image segments are different.

In contrast, when corresponding sound segments and image segments that appear at the same time in this exemplary embodiment, the score calculated between the image segments and other sound segments is considered.

This corresponding method ensures that when there are a plurality of image segments having an occurrence pattern similar to the occurrence pattern of sound segments, correspondence between the sound segments and the image segments, which include an identical object, are made The related technology tends to erroneously make correspondence between image segments and sound segments that appear close in time but include different objects.

In contrast, correspondence between an image segment group and a sound segment group are made in this exemplary embodiment, based on the scores which are calculated based on the time during which those groups are present in the video at the same time. This corresponding method prevents erroneous correspondence between image segments and sound segments, which appear close in time but include different objects, respectively, from being made.

<Second Exemplary Embodiment>

Next, a second exemplary embodiment of the present invention will be described below in detail with reference to the drawings.

Figure 5:
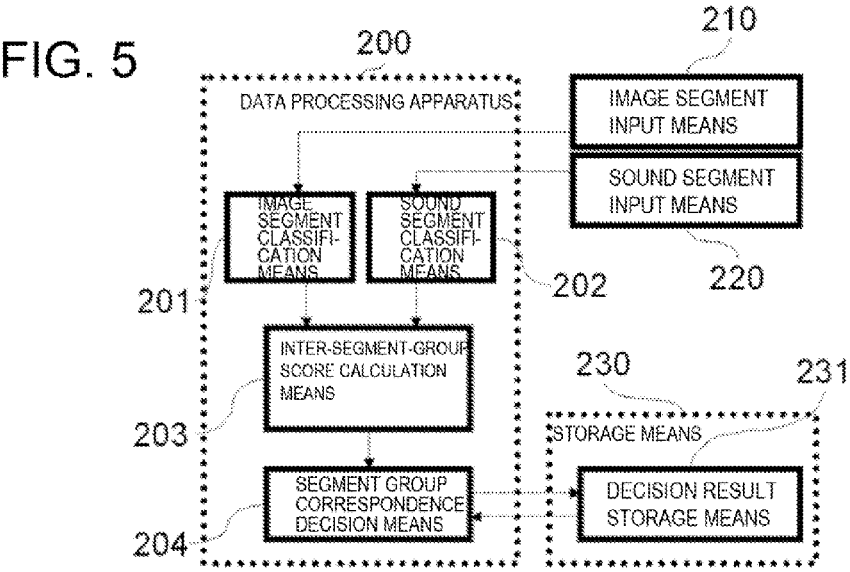
FIG. 5 is a block diagram showing the configuration of a second exemplary embodiment.

Referring to FIG. 5, the second exemplary embodiment of the present invention differs from the first exemplary embodiment in that a storage means (unit) 230 is provided. The storage means 230 comprises a decision result storage means (unit) 231.

The decision result storage means 231 stores the decision result of correspondence between the image segment groups and the sound segment groups serially received from a segment group correspondence decision means 204.

The decision result storage means 231 inputs the stored correspondence decision result to the segment group correspondence decision means 204.

Based on the scores received from inter-segment group score calculation means 203 and on the decision result of correspondence between the image segments and the sound segments received from the decision result storage means 231, the segment group correspondence decision means 204 judges the correspondence relation between the image segment groups and the sound segment groups. The decision result is input to the decision result storage means 231.

One of the correspondence relation decision methods is that a decision is made whether or not the object included in the image segment group and the object included in the sound segment group, for which the highest of the scores between image segment groups and the sound segment groups is calculated, are the same to establish one-to-one correspondence between the image segment group and the sound segment group.

Another correspondence relation decision method is that, in descending order of the length of the image segments, or the number of segments, of an image segment group, an image segment group is made to correspond to a sound segment group that has a score greater than or equal to the predetermined threshold and that is not made to correspond to another image segment group including an identical object.

A still another correspondence relation decision method is that each of the image segment groups is made to correspond to a sound segment group, for which a score that is the highest of the scores for the image segment group and is greater than or equal to the predetermined threshold is calculated and that each of the sound segment groups is made to correspond to an image segment group, for which a score that is the highest of the scores for the sound segment group and is greater than or equal to the predetermined threshold is calculated. Based on the correspondence result, the image segment groups which are made to correspond to the sound segment groups are made to correspond to the sound segment groups which are made to correspond to the image segment groups.

Using the correspondence relation decision methods described above, correspondence between image segment groups and sound segment groups may be made, one to one, one to many, or many to many.

Next, the general operation of this exemplary embodiment will be described in detail with reference FIG. 5 and the flowchart in FIG. 6.

Figure 6:
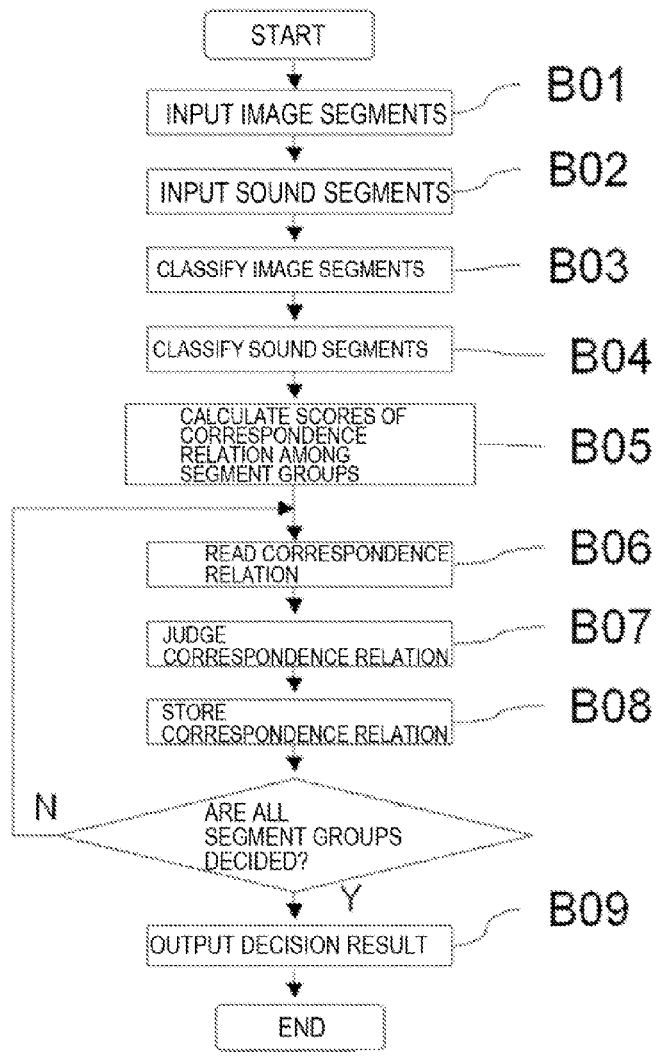
FIG. 6 is a flowchart showing the operation of the second exemplary embodiment.

The operation of image segment input means 210, sound segment input means 220, image segment classification means 201, sound segment classification means 202, and inter-segment group score calculation means 203 in this exemplary embodiment shown in steps B01-B05 and B09 in FIG. 6 is the same as that of the means 110, 120, 101, 102, and 103 of the first exemplary embodiment and, therefore, the description is omitted here.

The segment group correspondence decision means 204 first selects a set of an image segment group and a sound segment group whose correspondence relation is to be decided and reads from the decision result storage means 231 as to whether or not the selected segment groups are already made to correspond to other segment groups (step B06).

Based on the scores of correspondence relation between the image segment groups and the sound segment groups received from the inter-segment group score calculation means 203 and the correspondence result between the image segment groups and the sound segment groups received from the decision result storage means 231, the segment group correspondence decision means 204 decides the correspondence relation of the selected set of an image segment group and a sound segment group (step B07).

The segment group correspondence decision means 204 supplies the correspondence relation of the selected set of an image segment group and a sound segment group to the decision result storage means 231. The decision result storage means 231 stores the received decision result (step B08).

The segment group correspondence decision means 204 may change the correspondence relation decision method as follows according to the classification accuracy of the image segment classification means 201 and the sound segment classification means 202.

(A) Assume that, when the performance of both image segment classification and sound segment classification is good, the image segment groups and the sound segment groups and the scores, shown in FIG. 4 and FIG. 14, are received.

Because the performance of the image segment classification and the sound segment classification is good, image segment groups (1) to (5) are segment groups including different objects and sound segment groups (1)' to (3)' are segment groups including different objects.

Based on the scores calculated among those segment groups, one-to-one correspondence between the image segment groups and the sound segment groups is made, beginning with the set of an image segment group and a sound segment group for which the highest score is calculated.

First, correspondence between a set of image segment group (5) and sound segment group (2)', for which the highest score is calculated, are made, and this correspondence is stored in the decision result storage means 231.

A set of image segment group (3) and sound segment group (2)', for which the second highest score is calculated, are not made to correspond because sound segment group (2)' is already made to correspond to image segment group (5) by the decision result storage means 231.

Correspondence between a set of image segment group (3) and sound segment group (1)', for which the third highest score is calculated, is made and stored in the decision result storage means 231.

A set of image segment group (1) and sound segment group (1)' and a set of image segment group (2) and sound segment group (1)', each for which the fourth highest score is calculated, are not made to correspond because sound segment group (1)' is already made to correspond to image segment group (3) by the decision result storage means 231.

Correspondence between a set of image segment group (1) and sound segment group (3)', for which the fifth highest scores are calculated, are made and stored in the decision result storage means 231. At this point, the correspondence of all sound segment groups is completed and, so, the processing is terminated.

The processing described above results in making one-to-one correspondence between the image segment groups and the sound segment groups. This correspondence prevents a sound segment group, which has already been made to correspond to an image segment group as sound segments including an identical object, from being made to correspond to other image segment groups, thus preventing erroneous correspondence between segment groups including different objects from being made.

(B) When the classification performance of one of the image segment classification and sound segment classification is good, for example, when the performance of the image segment classification is good, the decision method is as follows.

Assume that the image segment groups, sound segment groups, and scores shown in FIG. 4 and FIG. 14 are received.

Because the performance of the image segment classification is good, the image segment groups (1)-(5) are segment groups including different objects.

On the other hand, assume that the performance of the sound segment groups is poor and the sound segment groups (1)' and (2)' are segment groups including an identical object.

Those image segment groups are made to correspond to the sound segment groups, which have a score greater than or equal to the threshold and are not made to correspond to other image segment groups, in descending order of the length of the image segments of an image segment group.

As the threshold of a score, which is used to control the correspondence between segments, becomes larger, the erroneous correspondence may be reduced.

The image segment groups, arranged (1)->(3)->(5)->(2)->(4) in the descending order of the sum of the time lengths of the image segments, are made to correspond to the sound segment groups in this order.

First, image segment group (1) has the highest score with sound segment group (1)' but, because the score is equal to lower than the threshold, is not made to correspond to the sound segment group (1)'.

Image segment group (3) has a score, greater than or equal to the threshold, with sound segment groups (1)' and (2)'.

Therefore, image segment group (3) is made to correspond to sound segment groups (1)' and (2)' and is stored in the decision result storage means 231.

Image segment group (5) has a score, greater than or equal to the threshold, with sound segment group (2)' but, because sound segment group (2)' is already made to correspond to image segment group (3) by the decision result storage means 231, is not made to correspond to sound segment group (2)'.

Image segment groups (2) and (4), which have not a score greater than or equal to the threshold with any sound segment group, are not made to correspond to any sound segment group.

At this point, the correspondence of all image segment groups is completed and, so, the processing is terminated.

The processing described above results in one-to-many making correspondence between the image segment groups and the sound segment groups.

This correspondence allows sound segment groups including an identical object to be made to correspond to an image segment group including an identical object.

Controlling the threshold of a score prevents erroneous correspondence between segment groups regarding different objects from being made.

(C) Assume that, when the classification performance of both image segment classification and sound segment classification is poor, the image segment groups and the sound segment groups and the scores, shown in FIG. 4 and FIG. 14, are received.

Because the performance of the image segment classification is poor, assume that image segment groups (3) and (5) are segment groups including an identical object.

Also assume that sound segment groups (1)' and (2)' are segment groups including an identical object.

Each of the image segment groups is made to correspond to a sound segment group, for which a score that is the highest of the scores for the image segment group and is greater than or equal to the predetermined threshold is calculated, and each of the sound segment groups is made to correspond to an image segment group, for which a score that is the highest of the scores for the sound segment group and is greater than or equal to the predetermined threshold is calculated. Based on the correspondence result, correspondence between the image segment groups which are made to correspond to the sound segment groups and the sound segment groups which are made to correspond to the image segment groups are made.

As the threshold of a score, which is used to control the correspondence between segments, becomes larger, the erroneous correspondence may be reduced.

Figure 7:
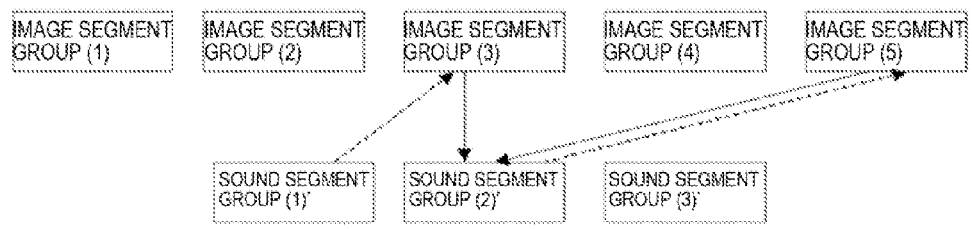
FIG. 7 is a diagram showing the operation of the segment group correspondence decision means in the second exemplary embodiment.

The following describes the flow of correspondence decision with reference to FIG. 7.

First, for the image segment groups, an image segment group is made to correspond to a sound segment group for which the highest score is calculated.

Image segment group (1) is not made to correspond to any sound segment group because there is no sound segment group for which a score that is highest and greater than or equal to the threshold is calculated. Similarly, image segment groups (2) and (4) are not made to correspond to any sound segment group.

Image segment group (3) is made to correspond to sound segment group (2)' for which a score that is greater than or equal to the threshold and is highest is calculated, and is stored in the decision result storage means 231.

Image segment group (5) is made to correspond to sound segment group (2)' for which a score that is greater than or equal to the threshold and is highest is calculated, and is stored in the decision result storage means 231.

In FIG. 7, the correspondence relation described above is indicated by solid-line arrows.

Next, for the sound segment groups, a sound segment group is made to correspond to an image segment group for which the highest score is calculated, and is stored in the decision result storage means 231.

Sound segment group (1)' is made to correspond to image segment group (3), sound segment group (2)' is made to correspond to image segment group (5), and they are stored in the decision result storage means 231.

Sound segment group (3)' is not made to correspond to any image segment group.

In FIG. 7, the correspondence relation described above is indicated by broken-line arrows.

The segment groups connected by the correspondence relation stored in the decision result storage means 231, that is, correspondence between image segment groups (3) and (5) and sound segment groups (1)' and (2)', which are connected by the arrows in FIG. 7, are made as segment groups of an identical object.

After the processing described above, the decision processing is terminated.

The processing described above results in making many-to-many correspondence between the image segment groups and the sound segment groups. This corresponding method can make correspondence between the image segment groups and the sound segment groups including an identical object.

Controlling the threshold of a score prevents erroneous correspondence of segment groups of different objects from being made.

Next, the effect of the second exemplary embodiment of the present invention will be described.

When making correspondence between sound segments and image segments is decided in the related technology, the decision is made based only on the occurrence patterns of the sound segments and the image segments with no consideration for the occurrence pattern correlation between the sound segments and other image segments. Therefore, when there are a plurality of image segments of an occurrence pattern similar to the occurrence pattern of sound segments, a plurality of image segments are sometimes erroneously made to correspond to the same sound segment, even if the objects of those image segments are different.

Contrary to this, in the present exemplary embodiment, when correspondence between sound segments and image segments that appear at the same time are made, the score calculated between the image segments and other sound segments is considered. This corresponding method ensures that, when there are a plurality of image segments whose occurrence pattern is similar to the occurrence pattern of sound segments, correspondence between the sound segments and the image segments, which include an identical object, are made.

The related technology tends to make erroneous correspondence between image segments and sound segments that appear close in time but include different objects. In contrast, correspondence between image segment groups and sound segment groups are made, in this exemplary embodiment, based on the scores calculated based on the time during which those groups are present in a video at the same time. This corresponding method prevents erroneous correspondence image segments and sound segments, which appear close in time but include different objects, from being made.

The related technology does not consider the correlation among image segments and the correlation among sound segments. Therefore, when a plurality of image segments or a plurality of sound segments are generated for an identical object as a result of image segment classification or sound segment classification, a plurality of image segments and a plurality of sound segments, which include an identical object, are not made to correspond.

In contrast, correspondence between sound segment groups and image segment groups, or sound segment groups and image segment groups, are made, in this exemplary embodiment, using the scores calculated among a plurality of image segments and a plurality of sound segments to generate image segment groups and sound segment groups, and then correspondence between the generated image segment groups and sound segment groups are made.

This corresponding method achieves an effect that, even if a plurality of image segments or a plurality of sound segments including an identical object are generated as a result of image segment classification or sound segment classification, correspondence between a plurality of image segments and a plurality of sound segments including an identical object can be found.

<Third Exemplary Embodiment>

Figure 8:
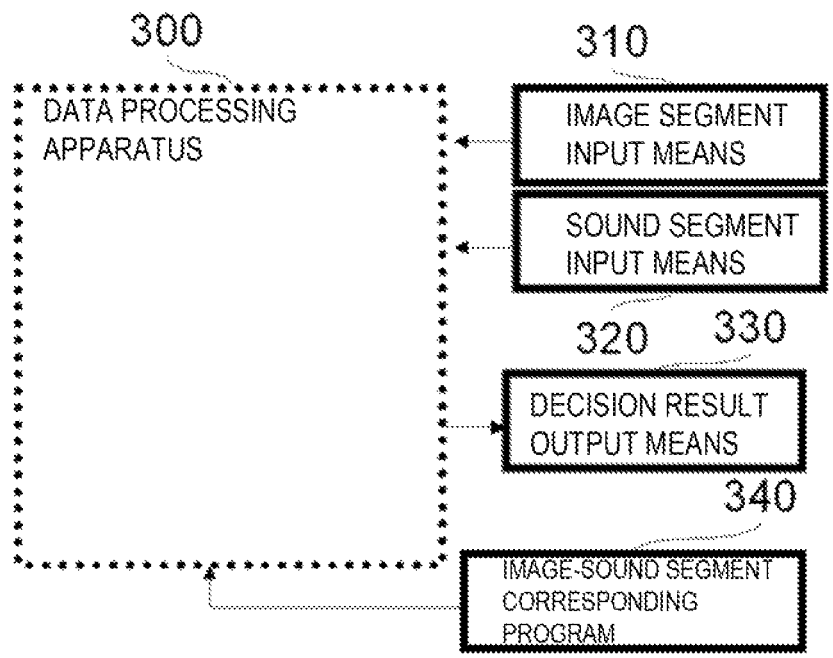
FIG. 8 is a block diagram showing the configuration of a third exemplary embodiment.

Next, a third exemplary embodiment of the present invention will be described in detail with reference to the drawings. Referring to FIG. 8, the third exemplary embodiment of the present invention comprises an image segment input means, a sound segment input means, a data processing apparatus, and a decision result output means in the same way as the first exemplary embodiment of the present invention.

An image-sound segment corresponding program 340 is read into a data processing apparatus 300 to control the operation of the data processing apparatus 300 and, based on image segments and sound segments received from an image segment input means 310 and a sound segment input means 320, outputs the decision result, obtained by the means of the data processing apparatus 300, to decision result output means 330. The data processing apparatus 300 performs the same processing as that performed by the data processing apparatus 100 in the first exemplary embodiment under control of the image-sound segment corresponding program 340.

<Fourth Exemplary Embodiment>

Figure 9:
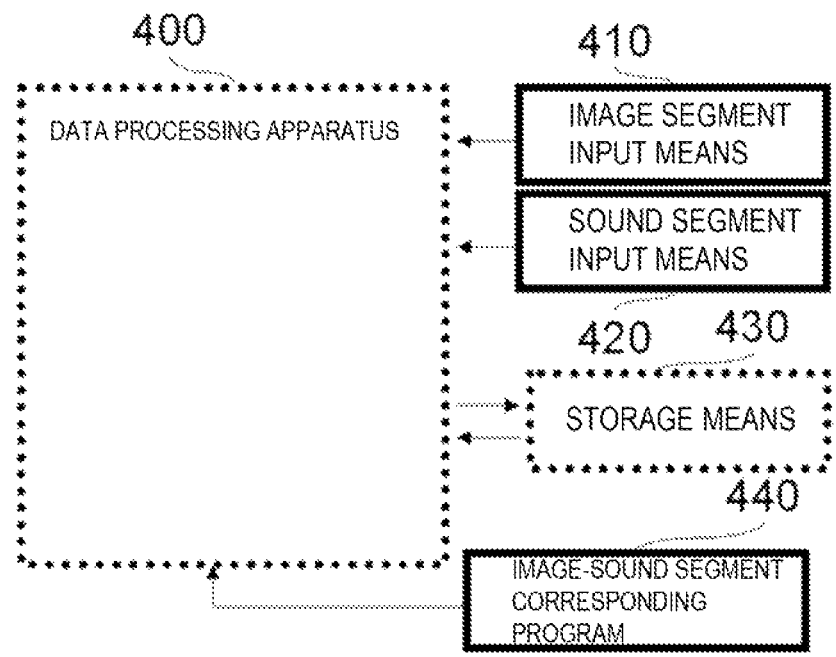
FIG. 9 is a block diagram showing the configuration of a fourth exemplary embodiment.
Figure 16:
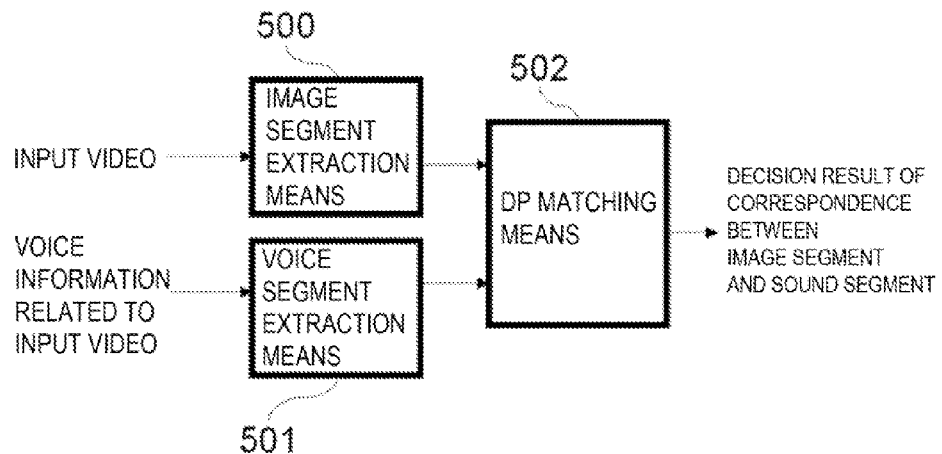
FIG. 16 is a block diagram showing the configuration disclosed in Non-Patent Document 1.
Figure 17:
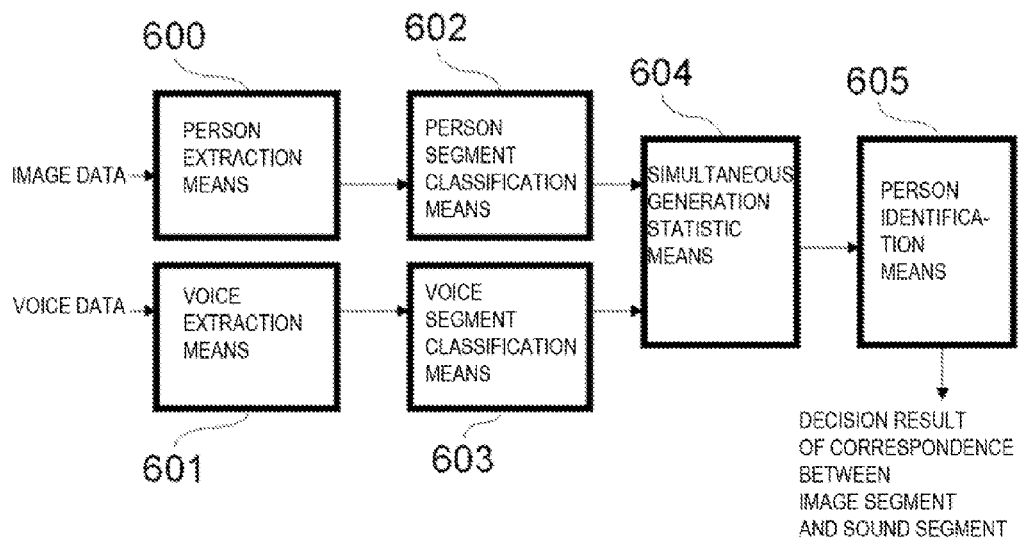
FIG. 17 is a block diagram showing the configuration disclosed in Patent Document 1.

Next, a fourth exemplary embodiment of the present invention will be described in detail with reference to the drawings. Referring to FIG. 9, the fourth exemplary embodiment of the present invention comprises an image segment input means, a sound segment input means, a data processing apparatus, and a storage means in the same way as the second exemplary embodiment of the present invention.

An image-sound segment corresponding program 440 is read into a data processing apparatus 400 to control the operation of the data processing apparatus 400 and, based on image segments and sound segments received from an image segment input means 410 and a sound segment input means 420, outputs the decision result obtained by the means of the data processing apparatus 400 to storage means 430. The data processing apparatus 400 performs the same processing as that performed by the data processing apparatus 200 in the second exemplary embodiment under control of the image-sound segment corresponding program 440.

FIRST EXAMPLE

Next, using actual examples, the operation of the exemplary embodiments for carrying out the present invention will be described. A first example corresponds to the first exemplary embodiment described above.

In the first example, there is presented example in which the image-sound segment corresponding apparatus of the present invention is used for a video clip of a plurality of sightseeing spots for making correspondence between the image segments of the sightseeing spots and the sound segments of the sightseeing spots. The term 'correspondence' in this example refers to the decision determining whether or not the image segments of a sightseeing spot and the sound segments of a sightseeing spot are the segments including the same sightseeing spot.

As shown in FIG. 10, a video input terminal is provided in this example as the image segment input means 110 in FIG. 1, a sound input terminal as the sound segment input means 120, a personal computer as the data processing apparatus 100, and a display as the decision result output means 130.

The personal computer configuring the data processing apparatus 100 has a central processing unit that functions as the image segment classification means 101, sound segment classification means 102, inter-segment group score calculation means 103, and segment group correspondence decision means 104.

Now, assume that image segments are input from the video input terminal 110 and that sound segments are input from the sound input terminal 120, each with the information on the start times and end times in the input video.

The image segments and the sound segments are the image information and the sound information respectively constituting the same video clip. Assume that the image segments are segments generated by dividing the input video in units of cuts and that the sound segments are unit sounds generated by dividing the input video at each silent point.

The image segment classification means 101 selects a representative image from each received image segment and classifies the image segments based on a similarity in the representative images to generate image segment groups. The time positions, such as the start points and the end points of the image segments belonging to each image segment group, and the image data are input to the inter-segment group score calculation means 103.

An example of the representative image selection method and the similarity decision method is that the slightest moving, least dim, clearest image is selected from the image segment, the image is divided into areas and, based on the similarity in color, shape, and movement among the divided areas, the image segments are classified.

The magnitude of movement is decided by detecting a motion vector from a change in the characteristic point common to the continuous frames and by checking the magnitude of the motion vector.

The extent of dimness is decided by the amount of high-frequency components included in a partial area. Using the similarity in the areas of an image selected in this way and suitable for area division, the image segments may be classified accurately.

Another method is that a frame, which includes an image area appearing most frequently in the segment, is selected and the image segments are classified based on the similarity in the extracted image areas.

An image area appearing frequently is an area detected from most of the frames, for example, by dividing the frames constituting an image segment into areas and classifying the areas using the similarity in the image feature.

For example, when a video clip is including the video of Hawaii in which palm trees and a sea appear in the shots and the video of New York in which buildings and cars appear in the shots, a blue still area and a still area including the green part at the top and the brown part at the bottom are extracted from the image segments of Hawaii while a gray, still rectangle area and a dynamic area of various colors are extracted from the image segments of New York. The image segments may be classified according to the similarity in the feature based on the color, shape, and movement of this area. The example described above or any other method may be used as the image segment classification method.

When the method described above is used, the image segment groups may not always be classified accurately if the areas of a sea, palm trees, buildings, or cars are not detected or if the image feature such as a color, shape, and movement extracted from the areas differ according to the shot.

FIG. 11 shows an example of the classification result. In FIG. 11, the video segments representing the contents of Hawaii and New York in the input video are indicated by thick arrows.

The sound segment classification means 102 classifies the sound segments based on the similarity in the sound feature extracted from the received sound segments and generates sound segment groups.

The time positions of the start points and end points of the sound segments belonging to each sound segment group and the sound data are input to the inter-segment group score calculation means 103.

To decide the similarity of the sound segments, the narrator's voices are removed from the sound segments to extract the BGM and, after that, the sound groups are classified into segments each having a similarity in the BGM rhythms, major musical instruments, and melodies. For example, when a video clip is including the video of Hawaii in which slow-tempo music played primarily by ukulele is used as the BGM and the video of New York in which fast-tempo music played primarily by piano is used as the BGM, the sound segments may be classified into those of New York and those of Hawaii according to the frequency characteristics and the speed of the rhythms. The example described above or any other method may be used as the sound segment classification method.

The method described above, if used, may fail to produce a sufficient feature when the segment lengths are short, sometimes resulting in a failure in the sound segment classification as in FIG. 11.

The inter-segment group score calculation means 103 calculates the similarity scores among the image segment groups and the sound segment groups based on the times, during which both an image segment group and a sound segment group are present at the same time, obtained from the time positions of the start points and end points of the image segments belonging to the image segment groups and the time positions of the start points and end points of the sound segments belonging to the sound segment groups. The calculated scores are input to the segment group correspondence decision means 104.

The segment group correspondence decision means 104 uses the scores, received from the inter-segment group score calculation means 103, to decide whether or not the object included in an image segment group and the object included in a sound segment group are the same.

The segment group correspondence decision means 104 makes correspondence between an image segment group and a sound segment group based on the result indicating that they are the same and outputs the appearance times and the image data of the segments, belonging to the groups, correspondence of which are made, to the display 130.

Assume that the image segment groups and the sound segment groups, such as those in FIG. 11, are received from the inter-segment group score calculation means 103. The image segment groups are made to correspond to the sound segment groups in the descending order of the sum of the time lengths of the image segments, that is, in order of (4)->(1)->(5)->(2)->(3).

First, image segment group (4) is made to correspond to sound segment group (2)' for which the highest score is calculated and whose score with other image segment groups is less than or equal to the predetermined threshold.

Similarly, image segment group (1) is made to correspond to sound segment group (1)'.

Image segment group (5) has the highest score with sound segment group (2)' but is not made to correspond to sound segment group (2)' because sound segment group (2)' has a score, which is greater than or equal to the threshold, with image segment group (4).

Image segment group (2) has the highest score with sound segment group (1)'.

Image segment group (2) is made to correspond to sound segment group (1)' because sound segment group (1)' has a score, which is less than or equal to the threshold, with any other image segment.

Similarly, image segment group (3) is made to correspond to sound segment group (1)'.

As a result, image segment groups (1), (2), and (3) are made to correspond to sound segment group (1)', and image segment group (5) is made to correspond to sound segment group (2)'.

The display 130 displays times of the image segments and the sound segment groups, correspondence therebetween being made, based on the correspondence decision result of the image segment groups and sound segment groups received from the segment group correspondence decision means 104.

The table format shown in FIG. 15 or any other display format may be used.

For the image segment groups and the sound segment groups, correspondence therebetween being made based on FIG. 15, the image data belonging to the image segment groups and the sound data belonging to the sound segment groups are combined to generate a new video to allow a summary video of the sightseeing spots to be generated and played easily.

SECOND EXAMPLE

A second example shows an example in which the image-sound segment corresponding apparatus of the present invention is used for a drama video, in which a plurality of performers appear, for corresponding the image segments of the performers and the sound segments of the performers.

The term 'correspondence' in this example refers to deciding whether or not image segments including frames including face images of a performer, and sound segments including voices of a performer are segments including the same performer.

As shown in FIG. 12, a video input terminal is provided as the image segment input means 210, a sound input terminal as the sound segment input means 220, a personal computer as the data processing apparatus 200, and a hard disk as the storage means 230 in this example.

The personal computer 200 has a central processing unit that functions as the image segment classification means (facial segment classification means) 201, sound segment classification means (voice segment classification means) 202, inter-segment group score calculation means 203, and segment group correspondence decision means 204.

Now, assume that image segments are input from the video input terminal 210 and that sound segments are input from the sound input terminal 220, each with the information on the start times and end times of the segments.

The image segments and the sound segments are the image information and the sound information constituting the same program respectively. Assume that the image segments are segments generated by dividing the video image information by the appearing points and disappearing points of human faces and that the sound segments are segments generated by dividing the video by the appearing points and disappearing prints of person's voices.

The image segment classification means 201 detects the faces of one or more persons from the representative frames of the image segments and, based on the similarity in the detected faces, classifies the image segments to generate facial segment groups. Each image segment may be classified into a plurality of facial segment groups.

The image segment classification means 201 inputs the time positions of the start points and end points of the image segments, which belong to each of the facial segment groups, and their image data into the inter-segment group score calculation means 203.

To detect a face, there is a method that uses information obtained from the entire face image. For example, one of the methods is that, with face images of various persons stored as templates, a partial area of each frame is converted geometrically and, if the difference between the converted partial area and a template is less than or equal to the threshold, the partial area is decided as a face. Another method is that, with the face models stored in advance each of which is a combination of color information such as flesh color and the edge directions/densities, an area similar to a model, if detected from a frame, is decided as a face.

As described in Non-Patent Document 2, the following methods may also be used, that is, a method that detects a face using templates created by using the fact that an outline of a face (head) is an ellipse and eyes and a mouth are of slender shape, a method that uses the characteristics of brightness distribution indicating that the brightness of parts corresponding to cheeks and a brow is high and the brightness of parts corresponding to eyes and a mouse is low, and a method that uses a symmetry of a face, and flesh color area and position.

As a method for statistically learning a feature distribution obtained from a large amount of human face or non-face learning samples and for determining to which distribution, face or non-face, the feature obtained from an input image belongs, there are methods that use a neural-net, a support vector machine, and the AdaBoost method. By using the example described above or any of the other methods, human faces may be detected from a frame.

It is of course possible to use the example described above or other methods as the face detection method.

The similarity in the faces detected from the image segments may be obtained by the difference in the face feature vectors extracted from the faces. As described in Non-Patent Document 3, the feature vectors include the characteristic vector that numerically describes the shape of, and the positional relation among, eyes, a nose, and a mouth based on the knowledge on the structure of the face, the characteristic vector that represents a face as a two-dimensional array of shading values of pixels of the face, and the characteristic vector called Gabor jet that can represent the local periodicity and the directionality of a pattern obtained by performing wavelet transformation for the characteristic points of a face. It is possible to use the examples described above or other methods as the face feature.

The sound segment classification means 202 detects human's voices from the sound segments and classifies the sound segments to generate sound segment groups based on the similarity in the detected voices. Each sound segment may be classified into a plurality of sound segment groups.

The time positions of the start points and the end points of the sound segments belonging to the sound segment groups and the sound data are input to the inter-segment group score calculation means.

To detect voices, a method that uses voice recognition may be used. For example, based on the voice signals of various human voices and the audio signals of various types of music, the method learns the difference between human voices and music and classifies the received sound segments into one of them according to the characteristics.

Another method is that the sounds such as inserted songs and BGM, which will be used in drama videos, are stored in advance.

When sound signals in which human voices and BMG are superimposed are received, BGM whose frequency characteristic is most similar to that included in the input signal is selected and the difference between the BGM and the input signal is calculated to detect human voices. The similarity in the voices may be decided based on the voice characteristics such as the voiceprints, speech speed, estimated result of sex, and estimated result of age extracted from the sound segments. It is possible to use the examples described above or other methods for detecting voices and deciding the similarity.

The inter-segment group score calculation means 203 calculates the similarity scores among the facial segment groups and the voice segment groups based on the times which are obtained from the time information on the start points and end points of the image segments belonging to the facial segment groups and the start points and end points of the sound segments belonging to the sound segment groups and during which the facial segment groups and the voice segment groups are present at the same time.

The scores may be weighted based on the face information received from the image segment classification means 201 and the voice information received from the sound segment classification means 202.

The face information includes the position, size, and direction of a face in the face frame used by the image segment classification means as the classification criterion. The voice information includes the volume and clarity of voices used by the sound segment classification means 202 as the classification criterion.

For example, there is a high possibility that the person whose face size on the screen is large and who faces the front is the speaker that speaks a clear voice detected at that time. Weighting the scores based on the face information and the voice information described above will ensure more accurate correspondence between facial segment groups and voice segment groups.

The calculated scores, the time positions of the facial segment groups and the voice segment groups, and the image data are input to the segment group correspondence decision means.

Beginning with the set of a facial segment group and a voice segment group for which the highest of the scores is received from the inter-segment group score calculation means 203, the segment group correspondence decision means 204 sequentially decides whether or not the objects included in the segment groups are the same and establishes one-to-one correspondence among the facial segment groups and the voice segment groups.

The correspondence decision result among the facial segment groups and the voice segment groups, image data on the facial segment groups belonging to the facial segment groups, and sound data on the sound segments belonging to the voice segment groups are input to the decision result storage means 231.

The decision result storage means 231 saves the segment group correspondence decision result received from the segment group correspondence decision means 204. The correspondence decision result may be a correspondence table of the image segments and the sound segments, correspondence therebetween being made, such as the one shown in FIG. 15, or any other format.

A user may create a search dictionary of the faces and voices of the performers based on the image data and the sound data on the image segment groups and the sound segment groups, correspondence therebetween being made as the groups including the same performer. Using this dictionary, the appearance positions of the faces and voices of a specified person can be searched for from the video easily.

The user may also combine the image data and the sound data of the image segment groups and the sound segment groups, correspondence therebetween being made as groups including the same performer, to generate a new video for use in playing a short clip for checking the performers.

In addition, based on the positions, sizes, and directions of the face images included in the facial segments of the performers and on the clarity and volume of voices included in the sound segments, the user may select representative segments to generate a new video for producing a briefer short clip efficiently used for checking the faces and voices.

For a combination of the image segment groups and the sound segment groups, correspondence therebetween being made as groups including the same performer, the user may combine the image data and the sound data to generate a new video and generate a list of performers by displaying the representative images selected from the new video.

By playing back a new video into which user-specified representative images are extracted, a short clip of desired performers may be provided to the user.

Industrial Applicability

The present invention is applicable to an image-sound segment corresponding apparatus that makes correspondence between the images and the sounds including an identical object and to a program that implements the image-sound segment corresponding apparatus in a computer for generating a short clip for use in checking the images and the sounds of the objects in a video and for generating an object search dictionary based on the images and the sounds. The present invention is applicable also to the generation of a performer introduction short clip used to check the faces and the voices of the performers in a drama video, to the generation of a list of the images including the performers, and to the generation of a performer search dictionary in which correspondence between the faces and voices of the performers are made.

The Patent Document and Non-Patent Documents given above are incorporated by reference into this specification. The exemplary embodiments and the examples may be changed and adjusted in the scope of the entire disclosure (including claims) of the present invention and based on the basic technological concept thereof. In the scope of the claims of the present invention, various disclosed elements may be combined and selected in a variety of ways. It is to be understood that the present invention includes modifications and changes that may be made by those skilled in the art within the scope of the present invention.

What is claimed is:

1. An image-sound segment corresponding method comprising:

an image segment classification step that analyzes an input video to generate a plurality of image segment groups, each of the image segment groups including a plurality of image segments which include an identical object;

a sound segment classification step that analyzes the input video to generate a plurality of sound segment groups, each of the sound segment groups including a plurality of sound segments which include an identical object;

an inter-segment group score calculation step that calculates a similarity score between each image segment group and each sound segment group, based on times respectively obtained from time points of a start point and an end point of each image segment and from time points of a start point and an end point of each sound segment, during which at least one of the image segment group and the sound segment group is present; for each combination of the image segment group and the sound segment group; and a segment group correspondence decision step that decides, using the scores, whether or not an object in the image segment groups and an object in the sound segment groups are the same to make correspondence between the image segment group and the sound segment group, wherein the image segment includes a segment generated by dividing a video based on a time position of an appearance or a disappearance of an object including at least one of a human face and another identifiable object, and the sound segment includes a segment generated by dividing a video based on a time position of an appearance or a disappearance of a sound including at least one of a human voice and another distinguishable sound.

2. The image-sound segment corresponding method according to claim 1, wherein the inter-segment group score calculation step comprises calculating the similarity score between each image segment group and each sound segment group, based on a time duration on which the image segment group and the sound segment group are present at the same time.

3. The image-sound segment corresponding method according to claim 1, wherein the image segment classification step comprises extracting an image feature of an object from each image segment in the input video and classifying a plurality of image segments each having a similar image feature of an object into the same image segment group, and the sound segment classification step comprises extracting a sound feature of an object from each sound segment in the input video and classifying a plurality of sound segments each having a similar sound feature of an object into the same sound segment group.

4. The image-sound segment corresponding method according to claim 1, wherein the image segment classification step comprises classifying the image segments so that each image segment in the input video belongs to one image segment group but does not belong multiply to a plurality of image segment groups, and the sound segment classification step comprises classifying the sound segments so that each sound segment in the input video belongs to one sound segment group but does not belong multiply to a plurality of sound segment groups.

5. The image-sound segment corresponding method according to claim 1, wherein a number of image segment groups generated by classifying the image segments in the input video in the image segment classification step and a number of sound segment groups generated by classifying the sound segments in the input video in the sound segment classification step are equal.

6. The image-sound segment corresponding method according to claim 1, wherein the inter-segment group score calculation step comprises calculating the similarity score between each image segment group and each sound segment group, based on a time duration on which only one of the image segments belonging to the image segment group and the sound segments belonging to the sound segment group is present.

7. The image-sound segment corresponding method according to claim 1, wherein the inter-segment group score calculation step comprises calculating the similarity score between each image segment group and each sound segment group, using the similarity score between each image segment group and each sound segment group and a weight which is calculated based on one of the image feature and the sound feature extracted from the segments or a combination thereof.

8. The image-sound segment corresponding method according to claim 1, wherein the segment group correspondence decision step comprises making the decision whether or not an object included in the image segment groups and an object included in the sound segment groups are the same, based on the scores to make correspondence between the image segment groups and the sound segment groups, the correspondence being at least one of one-to-one, one-to-many, and many-to-many correspondence.

9. The image-sound segment corresponding method according to claim 1, wherein the segment group correspondence decision step comprises:

making the decision sequentially whether or not an object included in the image segment groups and an object included in the sound segment groups are the same, for combination of image segment groups and sound segment groups, beginning with a set of an image segment group and a sound segment group for which the highest of the scores is calculated, or for combination of image segment groups and sound segment groups each having a score greater than or equal to a predetermined threshold and beginning with a set of an image segment group and a sound segment group for which the highest of the scores is calculated; and making one-to one correspondence between the image segment groups and the sound segment groups.

10. The image-sound segment corresponding method according to claim 1, wherein the segment group correspondence decision step comprises making correspondence between each image segment group and a sound segment group which has the highest score with the image segment group and which does not made to correspond to other image segment groups, or which has the highest score with the image segment group and whose score with other image segment groups is less than or equal to a predetermined threshold, in descending order of time length, or numbers of segments, of the image segments constituting the image segment groups.

11. The image-sound segment corresponding method according to claim 1, wherein the segment group correspondence decision step comprises making correspondence between each sound segment group and an image segment group which has the highest score with the sound segment group and which does not correspond to other sound segment groups, or which has the highest score with the sound segment group and whose score with other sound segment groups is less than or equal to a predetermined threshold, in descending order of time length, or numbers of segments, of the sound segments belonging to the sound segment groups.

12. The image-sound segment corresponding method according to claim 1, wherein the segment group correspondence decision step comprises making correspondence between an image segment group and a sound segment group, each of which the highest score is calculated, with regard to the scores of the plurality of image segment groups and the scores of the plurality of sound segment groups.

13. The image-sound segment corresponding method according to claim 1, wherein the segment group correspondence decision step comprises deciding that the image segment group and the sound segment group do not include an identical object and making no correspondence between image segment group and sound segment group, when the image segment group or the sound segment group has a score, less than or equal to a predetermined threshold, with any sound segment group or image segment group.

14. An image-sound segment corresponding method comprising:

an image segment classification step that analyzes an input video to generate a plurality of image segment groups, each of the image segment groups including a plurality of image segments which include an identical object;

a sound segment classification step that analyzes the input video to generate a plurality of sound segment groups, each of the sound segment groups including a plurality of sound segments which include an identical object;

an inter-segment group score calculation step that calculates a similarity score between each image segment group and each sound segment group, based on a time duration on which at least one of the image segment group and the sound segment group is present; and a segment group correspondence decision step that decides, using the scores, whether or not an object in the image segment groups and an object in the sound segment groups are the same, wherein the image segment includes a segment generated by dividing a video based on a time position of an appearance or a disappearance of a human face, and the sound segment includes a segment generated by dividing a video based on a time position of an appearance or a disappearance of a human voice.

15. An image-sound segment corresponding method comprising:

an image segment classification step that analyzes an input video to generate a plurality of image segment groups, each of the image segment groups including a plurality of image segments which include an identical object:

a sound segment classification step that analyzes the input video to generate a plurality of sound segment groups, each of the sound segment groups including a plurality of sound segments which include an identical object;

an inter-segment group score calculation step that calculates a similarity score between each image segment group and each sound segment group, based on a time duration on which at least one of the image segment group and the sound segment group is present; and a segment group correspondence decision step that decides, using the scores, whether or not an object in the image segment groups and an object in the sound segment groups are the same, wherein when a plurality of faces appear in the same frame, the image segment includes a segment generated by dividing a video based on a time position of an appearance or a disappearance of each face, and when voices of a plurality of persons are uttered at the same time, the sound segment includes a segment generated by dividing a video based on a time position of an appearance or a disappearance of each voice.

16. The image-sound segment corresponding method according to claim 1, wherein the image segment classification step comprises analyzing the input video to generate a plurality of facial segment groups, each of facial segment groups including a plurality of image segments which include a face of the same person, as the image segment groups, the sound segment classification step comprises analyzing the input video to generate voice segment groups, each of the voice segment groups including sound segments which include a voice of the same person, the inter-segment group score calculation step comprises calculating a similarity score between each facial segment group and each voice segment group based on a time duration on which the facial segment group and the voice segment group are present at the same time, and the segment group correspondence decision step comprises making the decision, using the scores, whether or not a person in the facial segment groups and a person in the voice segment groups are the same.

17. The image-sound segment corresponding method according to claim 16, wherein the inter-segment group score calculation step comprises calculating the similarity score between each facial segment group and each voice segment group using a time duration on which the facial segment group and the voice segment group are present at the same time, at least one of a face position, a face size, and a face direction extracted from each image segment, and at least one of a voice volume and a voice clarity extracted from each sound segment.

18. An image-sound segment corresponding method comprising:

an image segment classification step that analyzes an input video to generate a plurality of image segment groups, each of the image segment groups including a plurality of image segments which include an identical object;

a sound segment classification step that analyzes the input video to generate a plurality of sound segment groups, each of the sound segment groups including a plurality of sound segments which include an identical object;

an inter-segment group score calculation step that calculates a similarity score between each image segment group and each sound segment group, based on a time duration on which at least one of the image segment group and the sound segment group is present; and a segment group correspondence decision step that decides, using the scores, whether or not an object in the image segment groups and an object in the sound segment groups are the same, wherein the image segment classification step comprises classifying the image segments, generated by dividing the video based on a time position of an appearance or a disappearance of a face to generate a plurality of facial segment groups, each including image segments including faces of the same person, as the image segment groups, the sound segment classification step comprises classifying the sound segments, generated by dividing the video based on a time position of an occurrence or an extinction of a voice to generate voice segment groups each including sound segments including voices of the same person, the inter-segment group score calculation step comprises calculating the similarity score between each facial segment group and each voice segment group based on a time duration on which the facial segment group and the voice segment group are present at the same time, and the segment group correspondence decision step comprises making the decision whether or not a person in the facial segment groups and a person in the voice segment groups are the same, beginning with a set of a facial segment group and a voice segment group for which the highest of the scores is calculated, to make one-to one correspondence between the facial segment groups and the voice segment groups.

19. An image-sound segment corresponding apparatus comprising:

an image segment classification unit that analyzes an input video to generate a plurality of image segment groups, each of the image segment groups including a plurality of image segments which include an identical object;

a sound segment classification unit that analyzes the input video to generate a plurality of sound segment groups, each of the sound segment groups including a plurality of sound segments which include an identical object;

an inter-segment group score calculation unit that calculates a similarity score between each image segment group and each sound segment group based on times respectively obtained from time points of a start point and an end point of each image segment and from time points of a start point and an end point of each sound segment, during which at least one of the image segment group and the sound segment group is present, for each combination of the image segment group and the sound segment group; and a segment group correspondence decision unit that decides, using the scores, whether or not an object in the image segment groups and an object in the sound segment groups are the same to make correspondence between the image segment group and the sound segment group, wherein the image segment includes a segment generated by dividing a video based on a time position of an appearance or a disappearance of an object including at least one of a human face and another identifiable object, and the sound segment includes a segment generated by dividing a video based on a time position of an appearance or a disappearance of a sound including at least one of a human voice and another distinguishable sound.

20. The image-sound segment corresponding apparatus according to claim 19, further comprising:

an image segment input unit that inputs information on the image segments in the input video;

a sound segment input unit that inputs information on the sound segments in the input video; and a decision result output unit that outputs a decision result of correspondence between the image segment groups and the sound segment groups, wherein the image segment input unit supplies image data of the image segments in the input video, and time positions of start points and end points of the image segments in the input video, to the image segment classification unit, the sound segment input unit supplies sound data on the sound segments in the input video, and time positions of start points and end points of the sound segments in the input video, to the sound segment classification unit, the image segment classification unit classifies the image segments, based on the image data on the plurality of image segments received from the image segment input unit, generates the plurality of image segment groups, each including a plurality of image segments, and supplies to the inter-segment group score calculation unit the time positions of start points and end points of the image segments, classified into each image segment group, and the image data of the image segments, the sound segment classification unit classifies the sound segments, based on the sound data on the plurality of sound segments received from the sound segment input unit, generates the plurality of sound segment groups each including a plurality of sound segments, and supplies to the inter-segment group score calculation unit the time positions of start points and end points of the sound segments, classified into each sound segment group, and the sound data on the sound segments, the inter-segment group score calculation unit uses the time positions of the start points and end points of the image segments, which are received from the image segment classification unit and classified into each image segment group, and the time positions of the start points and end points of the sound segments, which are received from the sound segment classification unit and classified into each sound segment group, calculates the similarity score of each combination of the image segment group and the sound segment group, and supplies to the segment group correspondence decision unit the time positions of the image segments belonging to the image segment groups and the image data, the time positions of the sound segments belonging to the sound segment groups and the sound data, and the scores calculated for each combination of the image segment group and the sound segment group, the segment group correspondence decision unit decides whether or not an object in the image segment groups and an object in the sound segment groups are the same based on the scores received from the inter-segment group score calculation unit and calculated among the plurality of image segment groups and the plurality of sound segment groups, the time positions of the image segments belonging to the image segment groups and the image data, the time positions of the sound segments belonging to the sound segment groups and the sound data, and a correspondence decision result between the image segment groups and the sound segment groups are supplied to the decision result output unit, and the decision result output unit receives and outputs the correspondence decision result.

21. The image-sound segment corresponding apparatus according to claim 19, further comprising a decision result storage unit that stores therein a decision result of correspondence relation, wherein the segment group correspondence decision unit decides a correspondence relation between the image segment groups and the sound segment groups, based on the scores received from the inter-segment group score calculation unit and the decision result of correspondence between the image segments and the sound segments received from the decision result storage unit, and supplies the decision result to the decision result storage unit.

22. The image-sound segment corresponding apparatus according to claim 19, wherein the image segment classification unit analyzes the input video and generates a plurality of facial segment groups, each of the facial segment groups including image segments which include a face of the same person, as the image segment groups, the sound segment classification unit analyzes the input video and generates a plurality of sound segment groups, each of the sound segment groups including sound segments which include a voice of the same person, the inter-segment group score calculation unit calculates a similarity score between each facial segment group and each voice segment group based on a time duration on which the facial segment group and the voice segment group are present at the same time, and the segment group correspondence decision unit decides, using the scores, whether or not a person in the facial segment groups and a person in the voice segment groups are the same.

23. The image-sound segment corresponding apparatus according to claim 22, wherein the inter-segment group score calculation unit calculates the similarity score between the each facial segment group and the each voice segment group using a time duration on which the facial segment group and the voice group are present at the same time, at least one of a face position, a face size, and a face direction extracted from each image segment, and at least one of a voice volume and a voice clarity extracted from each sound segment.

24. An image-sound segment corresponding apparatus comprising:
   an image segment classification unit that analyzes an input video to generate a plurality of image segment groups, each of the image segment groups including a plurality of image segments which include an identical object;
   a sound segment classification unit that analyzes the input video to generate a plurality of sound segment groups, each of the sound segment groups including a plurality of sound segments which include an identical object;
   an inter-segment group score calculation unit that calculates a similarity score between each image segment group and each sound segment group; and
   a segment group correspondence decision unit that decides, using the scores, whether or not an object in the image segment groups and an object in the sound segment groups are the same, wherein the image segment classification unit classifies the image segments, generated by dividing the video based on a time position of an appearance or a disappearance of a face, generates facial segment groups, each of the facial segment groups including image segments which include the face of the same person, as the image segment groups,
   the sound segment classification unit classifies the sound segments, generated by dividing the video based on a time position of an occurrence or an extinction of a voice to generate voice segment groups, each of the voice segment groups including sound segments which include the voice of the same person,
   the inter-segment group score calculation unit calculates the similarity score between each facial segment group and each voice segment group, based on a time duration on which the facial segment group and the voice segment group are present at the same time, and
   the segment group correspondence decision unit decides whether or not a person in the facial segment groups and a person in the voice segment groups is the same, beginning with a set of a facial segment group and a voice segment group for which the highest of the scores is calculated, and makes one-to-one correspondence between the facial segment groups and the voice segment groups.

25. A computer-readable storage medium storing a program causing a data processing apparatus to perform the steps of the method according to claim 14.

26. A computer program causing a data processing apparatus to execute:
   an image segment classification processing that analyzes an input video to generate a plurality of image segment groups, each of the image segment groups including a plurality of image segments which include an identical object;
   a sound segment classification processing that analyzes the input video to generate a plurality of sound segment groups, each of the sound segment groups including a plurality of sound segments which include an identical object;
   an inter-segment group score calculation processing that calculates a similarity score between each image segment group and each sound segment group; based on times respectively obtained from time points of a start point and an end point of each image segment and from time points of a start point and an end point of each sound segment; during which at least one of the image segment group and the sound segment group is present, for each combination of the image segment group and the sound segment group; and
   a segment group correspondence decision processing that decides, using the scores, whether or not an object in the image segment groups and an object in the sound segment groups are the same to make correspondence between the image segment group and the sound segment group, wherein the image segment includes a segment generated by dividing a video based on a time position of an appearance or a disappearance of an object including at least one of a human face and another identifiable object, and the sound segment includes a segment generated by dividing a video based on a time position of an appearance or a disappearance of a sound including at least one of a human voice and another distinguishable sound.

* * * * *